(12) United States Patent
McClure et al.

(10) Patent No.: US 8,118,274 B2
(45) Date of Patent: Feb. 21, 2012

(54) MULTIPLE POSITION STAND

(75) Inventors: Stephen R. McClure, San Francisco, CA (US); Joshua D. Banko, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 98 days.

(21) Appl. No.: 12/511,599

(22) Filed: Jul. 29, 2009

(65) Prior Publication Data

US 2011/0025176 A1  Feb. 3, 2011

(51) Int. Cl.
*F16M 11/00* (2006.01)

(52) U.S. Cl. ........ 248/688; 248/455; 248/458; 248/469; 40/747; 40/748

(58) Field of Classification Search .................. 248/688, 248/441.1, 455, 458, 466, 469, 474, 481, 248/351, 357, 919; 40/700, 745, 747, 748, 40/749, 753, 754, 756
See application file for complete search history.

(56) References Cited

U.S. PATENT DOCUMENTS

| | | | | |
|---|---|---|---|---|
| 1,001,403 | A * | 8/1911 | Hipwell | 40/747 |
| 1,904,088 | A * | 4/1933 | Schutz | 248/455 |
| 2,456,720 | A * | 12/1948 | Miles | 40/747 |
| 3,343,777 | A * | 9/1967 | Becker | 248/455 |
| 5,329,712 | A * | 7/1994 | Keller | 40/747 |
| 5,436,792 | A | 7/1995 | Leman et al. | |
| 5,887,837 | A | 3/1999 | Johns et al. | |
| 5,933,996 | A * | 8/1999 | Chang | 40/748 |
| 5,941,493 | A * | 8/1999 | Cheng | 248/371 |
| 6,003,260 | A * | 12/1999 | Chang | 40/748 |
| 6,189,842 | B1 | 2/2001 | Bergeron Gull et al. | |
| 6,189,850 | B1 * | 2/2001 | Liao et al. | 248/292.14 |
| 6,651,943 | B2 * | 11/2003 | Cho et al. | 248/122.1 |
| 7,052,296 | B2 | 5/2006 | Yang et al. | |
| 7,448,580 | B2 | 11/2008 | Shimizu et al. | |
| 7,744,055 | B2 * | 6/2010 | Zeng et al. | 248/447 |
| 7,770,862 | B2 * | 8/2010 | Chen | 248/351 |
| 7,836,623 | B2 * | 11/2010 | Wang et al. | 40/747 |
| 2007/0138369 | A1 * | 6/2007 | Chang et al. | 248/688 |

OTHER PUBLICATIONS

Rotating iPhone Stand by Pivotal, http://www.podiumrevolution.com/Default.asp?Redirected=Y#fbid:1i4FXJCv2Uy, viewed Oct. 30, 2009.

* cited by examiner

*Primary Examiner* — Terrell McKinnon
*Assistant Examiner* — Bradley Duckworth
(74) *Attorney, Agent, or Firm* — Sterne, Kessler, Goldstein & Fox PLLC

(57) ABSTRACT

A support mechanism for supporting an object on a surface is disclosed. The support mechanism includes a joint connected to the object; and a stand connected to the joint. The joint may selectively rotate to allow the stand to support the object on the surface in: a first position comprising a landscape orientation at a first angle between the object and the surface, a second position comprising a landscape orientation at a second angle between the object and the surface, a third position comprising a portrait orientation at a third angle between the object and the surface, and a fourth position comprising a portrait orientation at a fourth angle between the object and the surface.

38 Claims, 18 Drawing Sheets

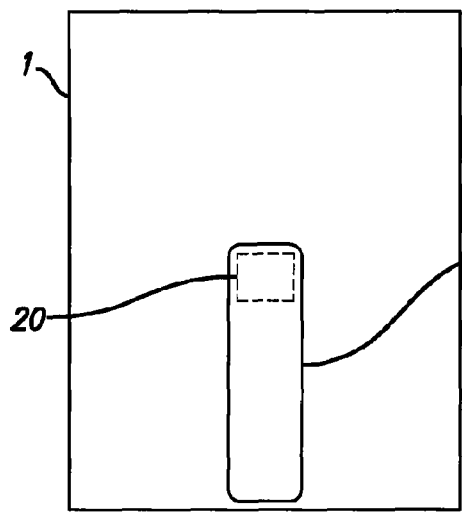
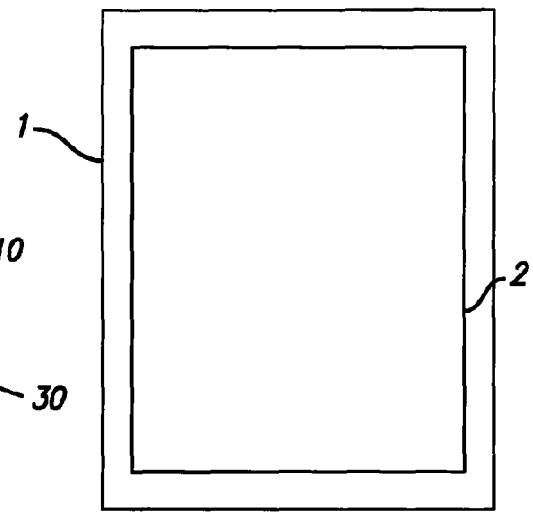
FIG. 1  FIG. 2
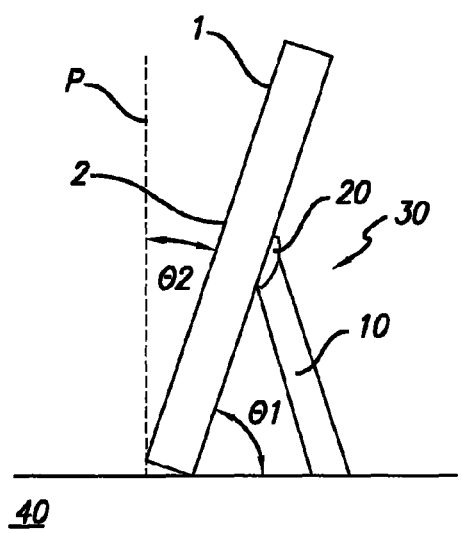
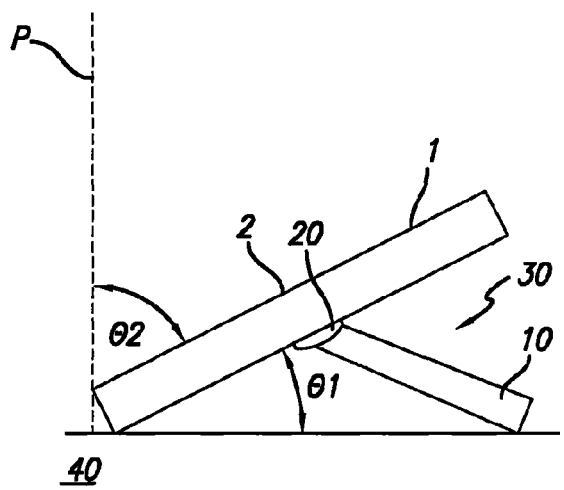
FIG. 3A  FIG. 3B

MULTIPLE POSITION STAND

BACKGROUND OF THE INVENTION

1. Field of the Invention

This invention relates to a stand, and more particularly to a stand for supporting an object in multiple positions.

2. Background Art

Various mechanisms have been used for supporting an object. Many objects are provided with a support mechanism that only allows the object to be supported in a single configuration. For objects having a display, the need for a support mechanism adapted to support the object in multiple configurations may be significant. As the market for consumer electronic devices continues to explode, consumers are seeking electronic devices, such as, for example, computers, for which they can have improved display orientations that meet their needs.

Support mechanisms may also be used to generate consumer interest in the product and the brand of the company who produces the product. For example, consumers of some electronic devices tend to be discriminating and savvy, and may choose a product having unique and sleek support mechanisms befitting the underlying technology of the product itself. Accordingly, there is a continuing need for support mechanisms for objects that allow for improved support configurations or that may provide a pleasing aesthetic appearance.

BRIEF SUMMARY OF THE INVENTION

In an embodiment, the invention relates to a support mechanism for supporting an object on a surface. The support mechanism includes a joint connectable to the object; and a stand connectable to the joint. The joint may selectively rotate to allow the stand to support the object on the surface in: a first position comprising a landscape orientation at a first angle between the object and the surface, a second position comprising a landscape orientation at a second angle between the object and the surface, a third position comprising a portrait orientation at a third angle between the object and the surface, and a fourth position comprising a portrait orientation at a fourth angle between the object and the surface. The joint may comprise a socket connected to the object, a ball, and a linking member connected to the ball.

In another embodiment, the invention relates to a support unit for supporting an object on a surface. The support unit includes a housing connectable to the object; a joint disposed at least partially within the housing; and a stand operatively connected to the joint for supporting the object on a surface. The support unit may include a linking member connecting the joint to the housing. The stand is adapted to support the object in a portrait support orientation at a first support angle greater than about 45 degrees between the object, a portrait support orientation at a second support angle less than about 45 degrees between the object and the surface, a landscape support orientation at a third support angle greater than about 45 degrees between the object and the surface, and a landscape support orientation at a fourth support angle less than about 45 degrees between the object and the surface.

In another embodiment, the invention relates to a display apparatus. The display apparatus includes a device having a visual display and a housing; a cam track formed in the device housing; a joint operatively connected to the cam track; and a stand connected to the joint for supporting the device, wherein the joint rotates the stand between a first support orientation at a first viewing angle of the visual display and in a second support orientation at a second viewing angle of the visual display. In one embodiment, the first viewing angle is different from the second viewing angle. In one embodiment, the first support orientation is the same as the second support orientation.

In a further embodiment, the invention relates to a computer having a housing and a visual display with a variable viewing angle defined by the position of the display and a vertical plane. The computer comprises: a socket operatively connected to the computer; a ball operatively connected to the socket; and a stand connected to the ball for supporting the computer on a surface, wherein the ball and socket rotate the stand between a landscape orientation at a first viewing angle, a landscape orientation at a second viewing angle, a portrait orientation at a third viewing angle, and a portrait orientation at a fourth viewing angle.

BRIEF DESCRIPTION OF THE DRAWINGS/FIGURES

FIG. 1 is a rear view of an object having a support unit according to an embodiment of the present invention.

FIG. 2 is a front view of the object of FIG. 1 according to an embodiment of the present invention.

FIG. 3A is a side view of the support unit of FIG. 1 supporting an object on a surface in a steep support angle position according to an embodiment of the present invention.

FIG. 3B is a side view of the support unit of FIG. 1 supporting an object on a surface in a shallow support angle position according to an embodiment of the present invention.

DETAILED DESCRIPTION OF THE INVENTION

Figure 4:
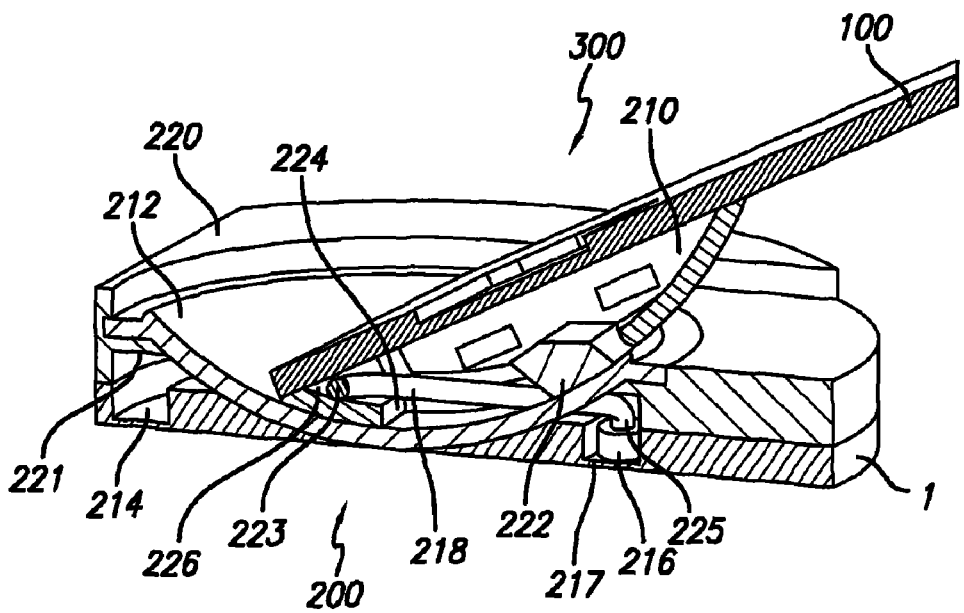
FIG. 4 is a cross-sectional view of a support unit according to an embodiment of the present invention.

The present invention is now described with reference to the Figures, in which like reference numerals are used to indicate identical or functionally similar elements. In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

References to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

With reference to FIGS. 1-3B, an embodiment of the present invention includes a support unit 30 including a stand 10 for supporting an object 1 on a surface 40, and a joint 20. The joint 20 may be connected to and/or connectable to the object 1 that is to be supported. The joint 20 may be manipulated to allow the stand 10 to move between different positions such that the object 1 may be supported at different support angle positions and in different support orientations.

The object 1 may comprise any object suitable for being supported. In one embodiment, the object 1 may comprise an object having a display 2, such as, for example, a computer. The support unit 30 may be configured to allow the display 2 to be provided to the user in a desirable position while the object 1 is supported on the surface 40. In one embodiment, the object 1 may comprise a computer, such as, for example, a tablet computer, in which the display is combined with one or more other computer components in a single housing unit. In one embodiment, the computer may not have a dedicated keyboard and the display 2 may comprise a touch screen such that the user may operate the display like a keyboard. Other objects which may be supported by a support unit 30 according to an embodiment of the present invention, include, but are not limited to, a laptop computer, a notebook computer, a slate computer, a monitor, a flat panel display, a sound playing device, a mobile phone, a television, a photograph display device, an electronic device, a game playing device, a projector, or any other object suitable for being supported. In one embodiment, the object 1 may not include a display 2.

The support unit 30 may be adapted to support an object 1 of any size and/or shape. In one embodiment, the object 1 may be generally rectangular in shape, as shown in FIG. 1. The object 1 may include rounded edges and/or corners to facilitate its support on a surface. In some embodiments, the support unit 30 may be adapted to support an object of a different shape, including, but not limited to, a circular, square, oval, or polygonal shaped object. In some embodiments, the support unit 30 may be adapted to support a symmetrically or asymmetrically shaped object.

In one embodiment, the support unit 30 is adapted to support the object 1 on a surface 40. The surface 40 may be a level surface, such as, for example, a desk or table. In other embodiments, the support unit 30 may be adapted to support the object 1 on a surface that is not level.

The support unit 30 may be configured to selectively support the object 1 on the surface 40 in a plurality of support angle positions. For example, the support unit 30 may be configured to selectively support the object 1 on the surface 40 at one or more support angles θ1 between the object 1 and the surface 40, as shown, for example, in FIGS. 3A and 3B. As a result, in embodiments of the present invention in which the object 1 includes a display 2, the support unit 30 may be configured to selectively support the object 1 on the surface 40 at one or more corresponding viewing angles θ2 between the display 2 and a vertical plane P generally perpendicular to the surface 40.

The support unit 30 may be configured to provide the display 2 to the user according to the user's needs. In this manner, the support unit 30 may be configured to selectively support the object 1 in a steep support angle position (as shown, for example, in FIG. 3A) and in a shallow support angle position (as shown, for example, in FIG. 3B). For example, a steep support angle position may be useful when the user is using the display 2 for viewing purposes and/or when the user is seated at a desk and is viewing the display 2 from a lower position. A shallow support angle position, for example, may be useful when the user is using the display 2 for input purposes (such as, for example, when the display 2 is being used as a virtual keyboard) and/or when the user is standing and is viewing the display 2 from a higher position.

In one embodiment, a steep support angle position may comprise an angle θ1 between the object 1 and the surface 40 that is greater than about 45 degrees, and a shallow support angle position may comprise an angle θ1 between the object 1 and the surface 40 that is less than about 45 degrees. In one embodiment, a steep support angle position may comprise an angle θ1 between the object 1 and the surface 40 that is greater than about 65 degrees. In one embodiment, a shallow support angle position may comprise an angle θ1 between the object 1 and the surface 40 that is less than about 25 degrees. The ranges of angles provided are meant to be exemplary only, and it is appreciated that the support unit 30 may be configured to support the object in other desired support angle positions. A specific exemplary embodiment will be described in more detail below.

The support unit 30 also may be configured to selectively support the object 1 on the surface 40 in a plurality of support orientations. For example, in embodiments in which the object 1 is generally rectangular in shape, as shown, for example, in FIG. 1, the support unit 30 may be adapted to provide a landscape support orientation and a portrait support orientation for the object 1. As will be readily appreciated, generally in a portrait support orientation the height of the object 1 is greater than the width. This orientation may be useful, for example, for displaying text from pages of a book on the display 2. Generally, in a landscape support orientation the width of the object 1 is greater than the height. This orientation may be useful, for example, for displaying an image or diagram on the display 2 that needs to be wider than the width of a portrait page. It will be appreciated that a non-rectangular and/or asymmetrical object having the same or greater height than its width nevertheless may be supported in a landscape support orientation and a portrait support orientation. For example, a non-rectangular object (such as an oval display) may be supported in a portrait support orientation by having the (vertical) height of the object greater than the (horizontal) width as it is supported. The support unit 30 may be configured to provide other support orientations, including, but not limited to, a rotated support orientation (for example, wherein only one of the corners of the object 1 shown in FIG. 1 rests on the surface 40), a non-rotated support orientation, a sideways support orientation, and an upside-down support orientation.

The support unit 30 may be configured to selectively support the object 1 at different support angle positions and in different support orientations. In one embodiment, the support unit 30 may support the object at a first support angle position in a first support orientation, and at a second support angle position in a second support orientation. In one embodiment, the first support angle position may be the same or different from the second support angle position and the first support orientation may be the same or different from the second support orientation. For example, the support unit 30 may be configured to support the object 1 at a shallow support angle position in a landscape support orientation, and at a steep support angle position in a portrait support orientation.

With reference to FIGS. 1 and 3A-3B, the support unit 30 may include a stand 10 operatively connected to a joint 20, which may be connected to and/or connectable to the object 1 that is to be supported. The joint 20 may be manipulated to allow the stand to move between different support angle positions and in different support orientations. In one embodiment, the joint 20 may allow the stand 10 to rotate about an axis between multiple support angle positions and multiple support orientations. The angle of the stand 10 relative to the joint 20 may change as the stand rotates to each of the multiple positions. As discussed above, this thereby causes the stand 10 to support the object at a different angle relative to the surface 40.

The joint 20 may comprise a suitable joint for being connectable to and/or connected to the object 1. In one embodiment, as will be discussed in greater detail below, the joint 20 may comprise a ball and socket joint. Other joints, including, but not limited to, a variable linkage joint, a hinged joint, an unhinged joint, a tongue and groove joint, a flexible joint, and/or other like joints or combinations thereof may be included.

In one embodiment, the support unit 30 may be permanently attached to the object 1. In one embodiment, all or a portion of the support unit 30 may be integral with the object 1, such that all or a portion of the support unit 30 and the object 1 form a unitary structure. In another embodiment, the support unit 30 may be otherwise attachable to the object 1. For example, the joint 20 and/or the stand 10 may be attached to the object 1 to be supported by securing means, such as, for example, a screw. Other securing means, including, but not limited to, magnets, adhesive, suction cups, locking means, latching means, or other suitable means may be used. In one embodiment, the support unit 30 may be removably securable to the object 1. In this manner, in some embodiments the support unit 30 may be manufactured and/or sold separately from the object 1 to be supported.

Another embodiment of the present invention will now be described with reference to FIGS. 4-25, in which like reference numerals may refer to like elements. The embodiment of the present invention includes a support unit 300 including a stand 100 for supporting an object 1 on a surface 40, and a joint 200. The joint 200 may be connected to and/or connectable to the object 1 that is to be supported. The object 1 may or may not include a display 2. The joint 200 is adapted to selectively move in order to allow the stand 100 to move between a plurality of support angle positions and/or support orientations for the object.

With reference to FIG. 4, in one embodiment, the joint 200 may comprise a ball and socket joint. The joint 200 may be disposed within a housing 220, and may include a ball 210 operatively coupled to a socket 212. The stand 100 may be connected to the ball 210, and may include a support end 101 (as shown, for example, in FIG. 11) for contacting the surface on which the object is to be supported. The socket 212 may be axially fixed within the housing 220, but rotatable about a collar 221 formed in the housing 220. The ball 210 may be movably restrained within the socket such that it is secured to the socket 212 but may be free to at least partially move within the socket. In one embodiment, the ball 210 may be adapted to axially translate within the socket 212 such that the stand 100 may correspondingly translate inwardly and outwardly from the housing 220. The contour, size, and shape of the ball 210 and socket 212 are preferably adapted such that the stand may translate outwardly from the housing 220 a sufficient amount to provide the desired support angles for the object 1. By manner of the rotation of the socket 212 and the axial translation of the ball 210 within the socket 212, the stand 100 may be rotated and translated through a plurality of positions and may define the position (e.g., angle and orientation) at which the object 1 is supported. In this manner, the position of the support end 101 of the stand is variable. In a preferred embodiment, the socket 212, and, correspondingly, the stand 100 may rotate 360 degrees with respect to the object 1.

Generally, the size and shape of the ball 210 and socket 212 may be configured such that the stand may achieve the desired angles and positions for supporting the object.

The socket 212 may be formed as part of the housing 220, or, alternatively, may be a discrete component within the housing 220. In one embodiment, in order to facilitate relative motion between the ball 210 and socket 212, these components may be made of one or more suitably low-friction materials, including, but not limited to, ceramic, plastic, steel, aluminum, and the like. In one embodiment, the ball 210 may be made of plastic and the socket 212 may be made of ceramic. In one embodiment, the ball 210 and/or the socket 212 may be coated with a low-friction polymer material, such as, for example, Teflon® or the like.

In one embodiment, the joint 200 includes a linkage member 218 disposed within the housing 220 and operatively connected to the ball 210. The linkage member 218 includes a first end 223 coupled to the ball 210 and a second end 225 coupled to a cam follower 216. As shown in FIG. 4, the first end 223 of the linkage member 218 may be disposed on one side of the interface between the ball 210 and the socket 212, and the second end 225 may be disposed on the other side of the interface between the ball 210 and the socket 212. In this manner, the linkage member 218 may also keep the ball 210 operatively connected to the socket 212.

The cam follower 216 is adapted to slide within a cam track 214. In one embodiment, the cam track 214 is a channel formed within the housing 220. In embodiments in which the support unit 300 is integral with the object 15 to be supported, the cam track 214 may be formed within the object 15 itself. For example, the cam track 214 may be formed in a housing or external surface of the object 15.

As shown, for example, in FIG. 4, the first end 223 of the linkage member 218 may be bent to fit within a wedge area 226 formed between the stand 100 and the ball 210. In this manner, the first end 223 of the linkage member 218 may provide sturdiness to the stand 100 and augment the support of the object 1. The second end 225 of the linkage member 218 may be bent such that the cam follower 216 is properly disposed in the cam track 214. In this manner, the linkage member 218 may correlate the position of the ball 210 and the socket 212 with the position of the cam follower 216 in the cam track 214.

The linkage member 218 and the cam follower 216 also may facilitate rotation and translation of the ball 210 and socket 212. As the ball 210 and socket 212 rotate, the cam follower 216 is adapted to slide within the cam track 214 such that the ball 210 and socket 212, and correspondingly, the stand 100, may achieve the desired support angle positions and support orientations for the object 1.

Figure 5:
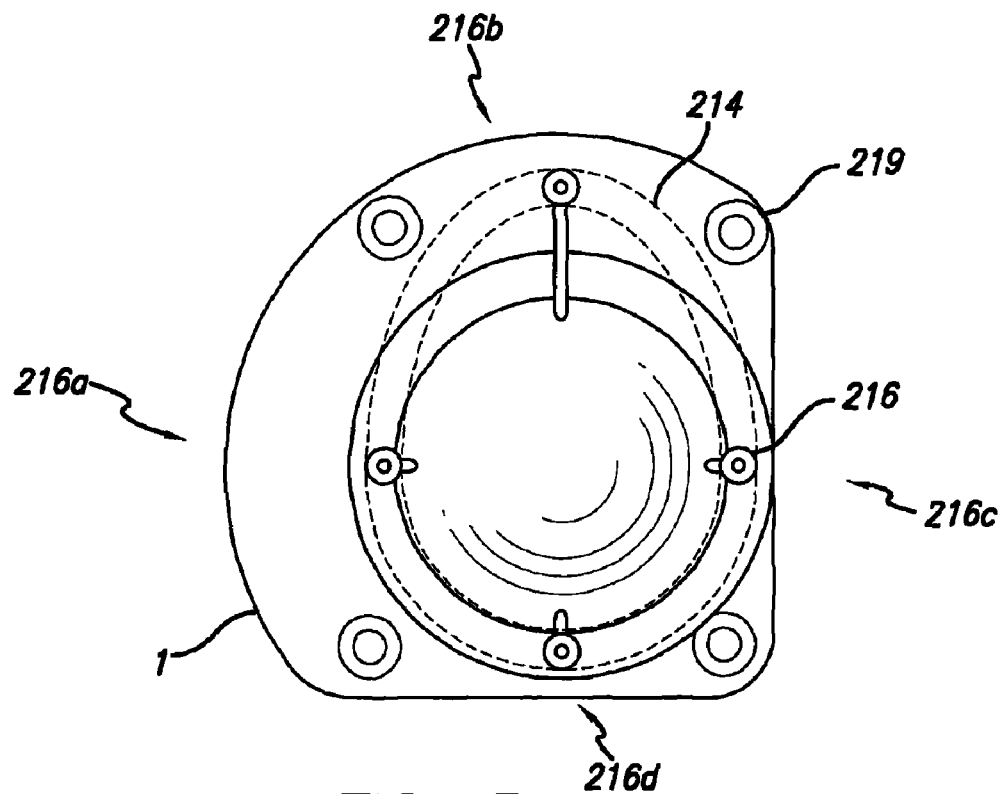
FIG. 5 is a rear view of a support unit according to an embodiment of the present invention.

The cam track 214 is shaped to receive the follower 216, and may be configured such that the ball 210 and socket 212, and correspondingly, the stand 100, achieve the desired support angle positions and support orientations for the object 1. In one embodiment, as shown in FIG. 5, the cam track 214 is elliptical in shape. The elliptical shape of the cam track 214 permits the cam to achieve desired positions to allow the stand 100 to achieve the desired support angle positions and support orientations for the object 1. In one embodiment, the cam track 214 may be symmetrical in shape, and in other embodiments, the cam track 214 may be asymmetrical. In one embodiment, as shown in FIG. 5, the cam track 214 may be pinched at one end so as to be egg-shaped. Other shapes for the cam track 214, including, but not limited to, a circular shape may be used as desired. The length and/or shape of the linkage member 218 may be changed depending on space constraints or the desired positions of the stand 100, thereby causing a corresponding change in the shape of the cam track 214.

In one embodiment, the linkage member 218 may comprise a suitably rigid material, such as, for example, steel, aluminum, plastic or the like such that the member 218 may provide sturdiness to the stand 100 and augment the support of the object 15. In one embodiment, the bent shape of the linkage member 218 at the first end 223 and/or the second end 225 may also provide sturdiness to the stand 100 and augment the support of the object 1. In one embodiment, in order to facilitate motion of the follower 216 within the cam track 214, the follower 216 may be made of one or more suitably low-friction materials, including, but not limited to, ceramic, plastic, steel, aluminum, and the like. In one embodiment, the follower 216 and/or the cam track 214 may be coated with a low-friction polymer material, such as, for example, Teflon® or the like.

In one embodiment, the joint 200 includes a clamp 222 slidably engaged with a groove 224 formed within the ball 210. The clamp 222 may be formed around a portion of the ball 210 and the socket 220 such that it is T-shaped and operatively connects the ball to the socket. The clamp 222 also may limit the movement of the ball 210 such that the ball 210 only axially translates within the socket 212 and does not rotate. As the ball 210 axially translates within the socket 212 (and, correspondingly, the stand 100 translates inwardly and outwardly from the object 1), the clamp 222 may slidably translate within the groove 224. In one embodiment, the clamp 222 may be made of a suitably low-friction material similar to the ball 210.

In one embodiment, the stand 100 may be formed integrally with the ball 210. Alternatively, the stand 100 may be otherwise attached to the ball 210. For example, the stand 100 may be attached to the ball 210 by securing means, including, but not limited to, screws, magnets, adhesive, or other suitable means. In one embodiment, the stand 100 may be removably securable to the ball 210.

The stand 100 may be sized and shaped so as to adequately support the object 1 while maintaining stable contact with the surface 40. In one embodiment, the stand 100 may be generally rectangular in shape and may have rounded edges. Other suitable shapes for the stand 100 may be used. In one embodiment, the stand 100 may be made of metal, such as, for example, stainless steel. Other materials for the stand 100, including, but not limited to, plastic or other suitably durable material may be used. In one embodiment, the stand 100 may be made of the same material as the outer surface of the object 1 so as to provide an aesthetically uniform appearance. In embodiments in which the object 1 comprises a display device, such as, for example, a computer, the stand 100 may be made of the same material as the housing of the display device.

In one embodiment, all or a portion of the support unit 300 may be integral with the object 1. For example, the housing 220 may be formed integrally with the object 1 to form a unitary structure. The housing 220 and the object 1 may be integrally formed using known manufacturing techniques. In another embodiment, the support unit 300 may be otherwise attached to the object 1. For example, the housing 220 may be attached to the object 1 to be supported by securing means 219, such as, for example, a screw. Other securing means 219, including, but not limited to, magnets, suction cups, latching means, locking means, adhesive, or other suitable means may be used. In one embodiment, the support unit 300 may be removably securable to the object 1. In this manner, in some embodiments the support unit 300 may be manufactured and/or sold separately from the object 1 to be supported.

As discussed above, the support unit 300 may be configured to selectively support the object 1 at one or more support angle positions and in one or more support orientations. In one embodiment of the present invention, the support unit 300 may be adapted to provide a finite number of support positions, each position corresponding to a particular support angle position and support orientation. In one embodiment, as shown in FIG. 4, a notch 217 may be formed in the cam track 214 at each support position, such that the follower 216 engages each notch as it rotates about the cam track. With the follower 216 engaged at a corresponding notch, the stand 100 may be secured in position and will not rotate without additional rotating force being applied. As such, the stand 100 may be sufficiently stable such that it may support the object 1. Each notch 217 may further provide a tactile feature such that it facilitates the user finding a particular support position. In an alternative embodiment, the notch 217 may be formed in the cam follower 216 and a spring-loaded protrusion may be formed in the cam track at each support position. The protrusion may be formed such that the follower 216 is secured at each protrusion as it rotates about the cam track. In still another embodiment, the cam follower 216 may be spring-loaded to further engage each notch 217 and become locked into position.

As will be discussed in more detail below, in some embodiments, the stand 100 may be rotated to provide a first support angle position and support orientation such that the stand 100 extends from the joint 200 in the same direction as the top of the object 1 (or the display 2 in embodiments of the object incorporating a display). The stand 100 may then be rotated to provide a second support angle position and support orientation such that the stand 100 extends from the joint 200 in a direction opposite the top of the object 1 (or the top of the display 2 in embodiments of the object which incorporate a display).

Figure 19:
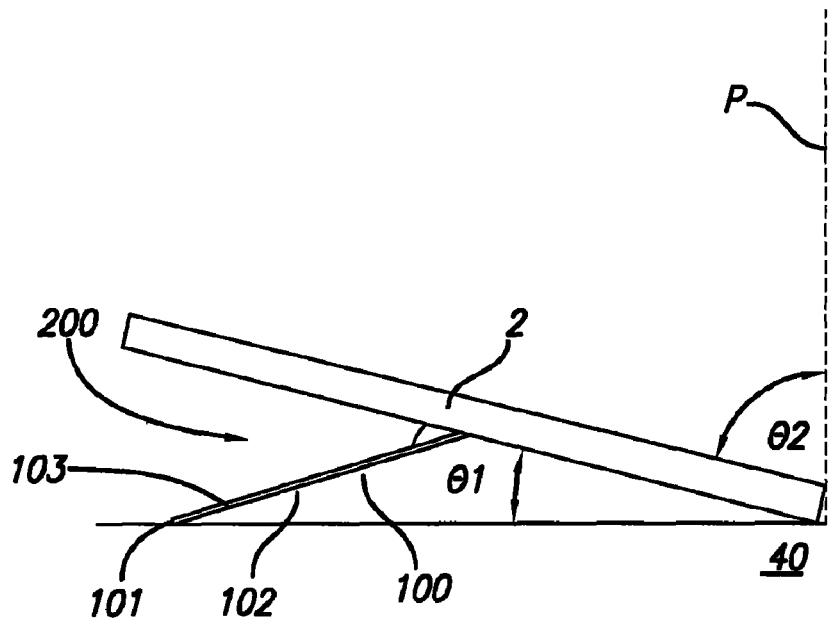
FIG. 19 is a side view of the support unit of FIG. 16 supporting the object on a surface according to an embodiment of the present invention.

As shown, for example, in FIG. 19, the stand 100 may include an exterior face 102 and an interior face 103. In some embodiments, as will be discussed in more detail below, the stand 100 may be rotated such that the exterior face 102 of the stand 100 at the support end 101 may face the surface 40, and, in some embodiments, the exterior face 102 of the stand 100 at the support end 101 may contact the surface 40. For example, the exterior face 102 of the stand 100 at the support end 101 may face the surface 40 in an embodiment in which the stand 100 may be rotated to provide a first support angle position and support orientation such that the stand 100 extends from the joint 200 in the same direction as the top of the object 1 (or the display 2 in embodiments of the object incorporating a display).

Operation of a support unit 300 according to an embodiment of the present invention will now described. A user may manipulate the stand 100 to cause the joint 200 to move through a plurality of positions. In particular, the joint 200 may be adapted to allow the stand to selectively support the object 1 on the surface 40 in four support positions, each position corresponding to a particular support angle position and support orientation.

As shown in FIG. 5, the joint 200 may move to be positioned in a first support position corresponding to cam follower position 216a. In this position, the object 1 may be supported at a steep support angle in a portrait orientation. The joint 200 may also move to be positioned in a second support position corresponding to cam follower position 216b. In this position, the object 1 may be supported at a steep support angle in a landscape orientation. The joint 200 may also move to be positioned in a third support position corresponding to cam follower position 216c. In this position, the object 1 may be supported at a shallow support angle in a portrait orientation. The joint 200 may also move to be positioned in a fourth support position corresponding to cam follower position 216d. In this position, the object 1 may be supported at a shallow support angle in a landscape orientation.

Figure 6:
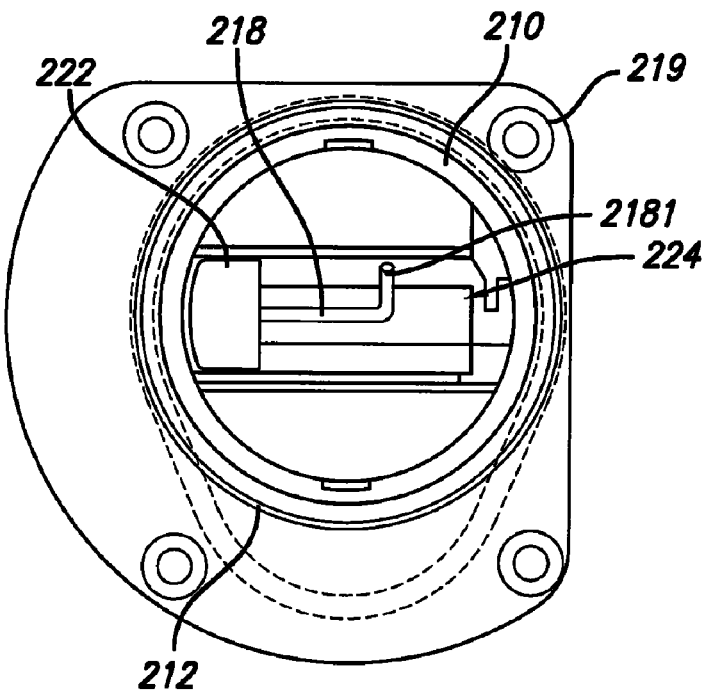
FIG. 6 is a cross-sectional view of a support unit in a closed position according to an embodiment of the present invention.
Figure 7:
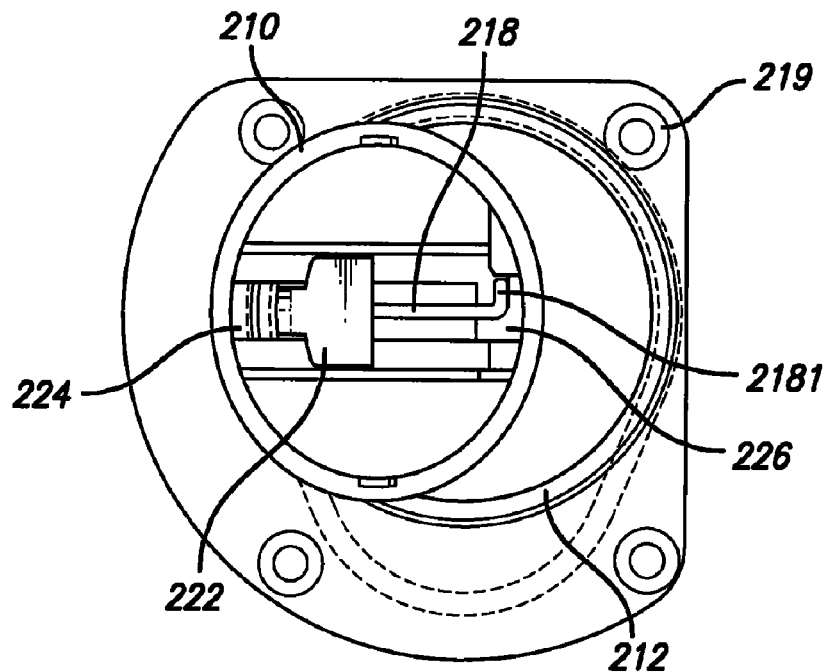
FIG. 7 is a cross-sectional view of a support unit in an initial open position according to an embodiment of the present invention.
Figure 8:
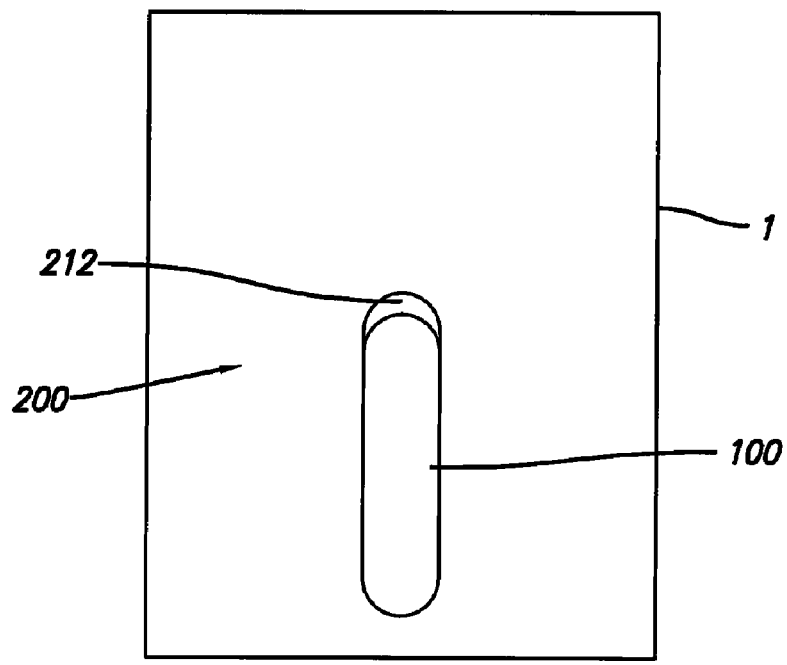
FIG. 8 is a rear view of a support unit supporting an object at a first support angle position in a first support orientation according to an embodiment of the present invention.

With reference to FIGS. 6 and 7, the initial extraction of the stand 100 will now be described. The support unit 300 may be adapted to move between a closed position, as shown in FIG. 6, and an initial open position, as shown in FIG. 7. When the support unit 300 is in the closed position, the clamp 222 may rest at the end of the groove 224. When the support unit 300 is moved into an initial open position, the stand 100 is moved outwardly from the housing 220. As the stand 100 moves outwardly, the ball 210 translates within the socket 212 and the clamp 222 slides out from its resting position and moves within the groove 224.

Figure 20:
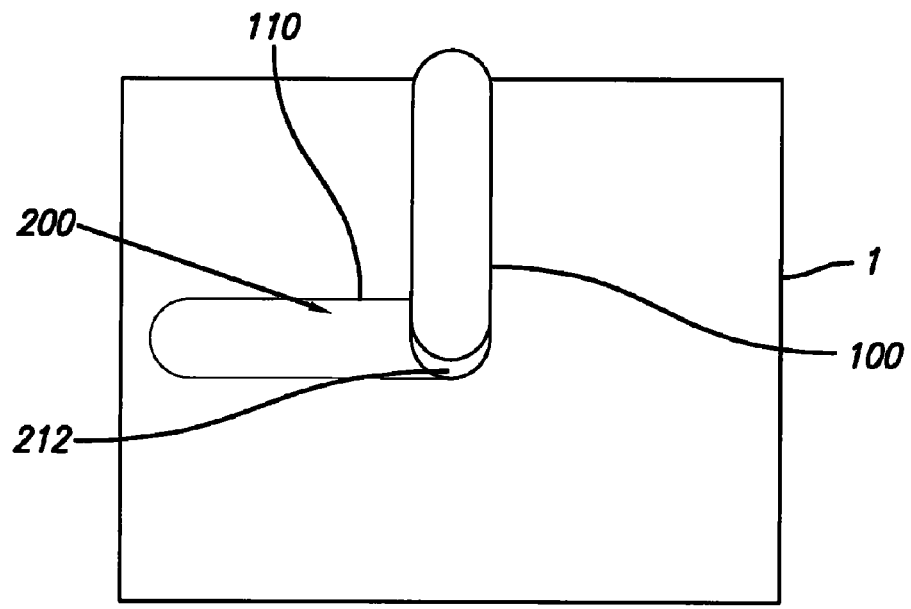
FIG. 20 is a rear view of a support unit supporting an object at a fourth support angle position in a fourth support orientation according to an embodiment of the present invention.

Before operation (e.g., during storage of the object 1) the stand 100 may be disposed in the recess 110 (as shown in FIG. 20), and, as a result, may be flush with the object 1. As shown in FIG. 6, in the closed position the ball 210 is positioned within the socket 212 and the clamp 222 is disposed at the end of the track 224. The user may then access the stand 100, and by pulling the stand outwardly from the object 1, the user may release the stand 100 from the closed position. As a result, as shown in FIG. 7, the ball 210 may translate within the socket 212, and thereby causing the clamp 222 to slide within the track 224. The cam follower 216 is disposed within the cam track 214 and the stand 100 is ready to be rotated by the user into the desired support position.

Figure 9:
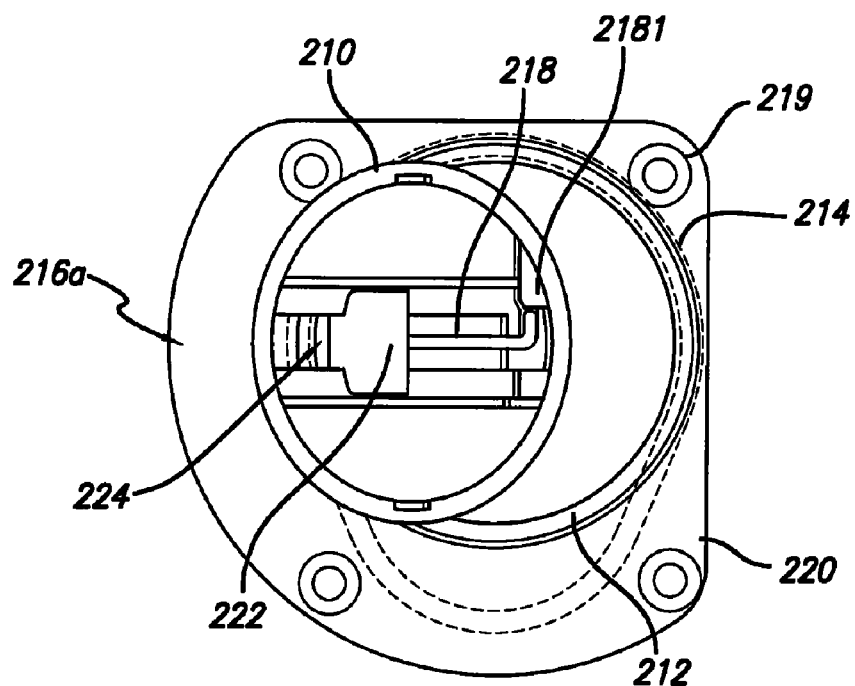
FIG. 9 is a rear cross-sectional view of the support unit of FIG. 8 according to an embodiment of the present invention.
Figure 10:
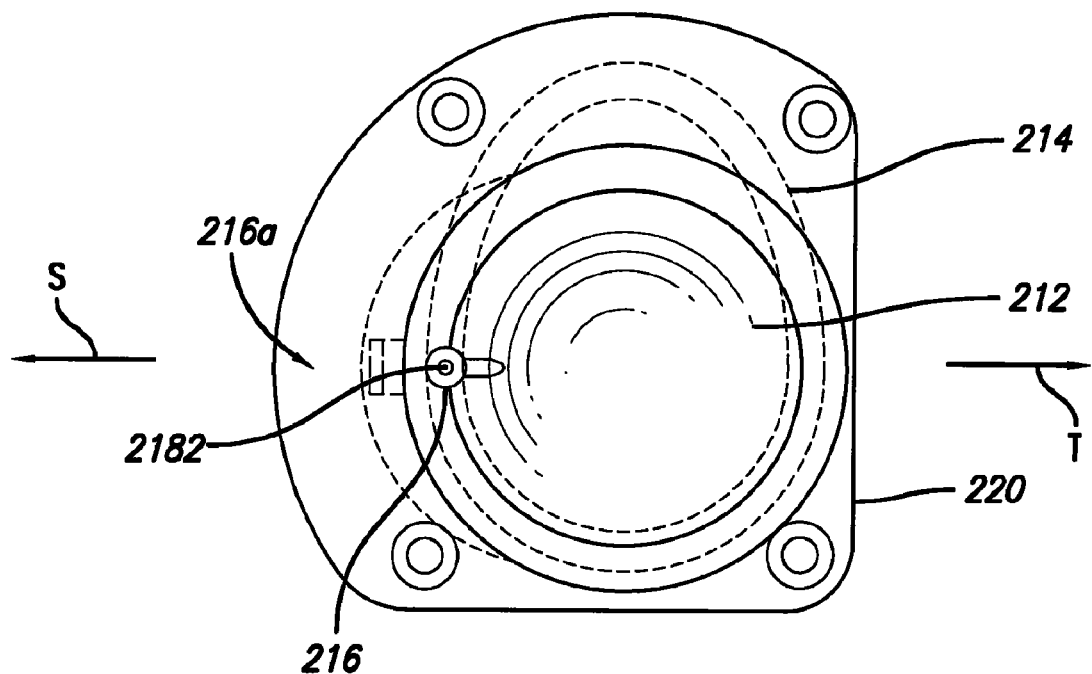
FIG. 10 is a front partially transparent view of the support unit of FIG. 8 according to an embodiment of the present invention.

With reference to FIGS. 8-11, the user may manipulate the joint 200 such that it is positioned in a first support position corresponding to cam follower position 216a. In one embodiment, the user may rotate the stand 100 thereby causing the socket 212 to rotate within the housing 220. As shown in FIGS. 9 and 10, as the socket 212 rotates, the cam follower 216 slides within the cam track 214. The ball 210 translates within the socket 212, thereby causing the clamp 222 to slide within the track 224. In one embodiment, the first support position may be the same position as the initial open position of the stand 100, as shown in FIG. 7. The user may rotate the joint 200 until the cam follower 216 is secured in the notch 217 corresponding to the desired first support position.

Figure 11:
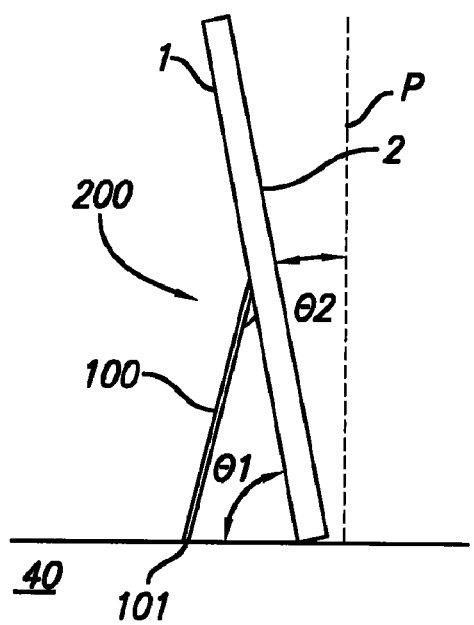
FIG. 11 is a side view of the support unit of FIG. 8 supporting the object on a surface according to an embodiment of the present invention.
Figure 12:
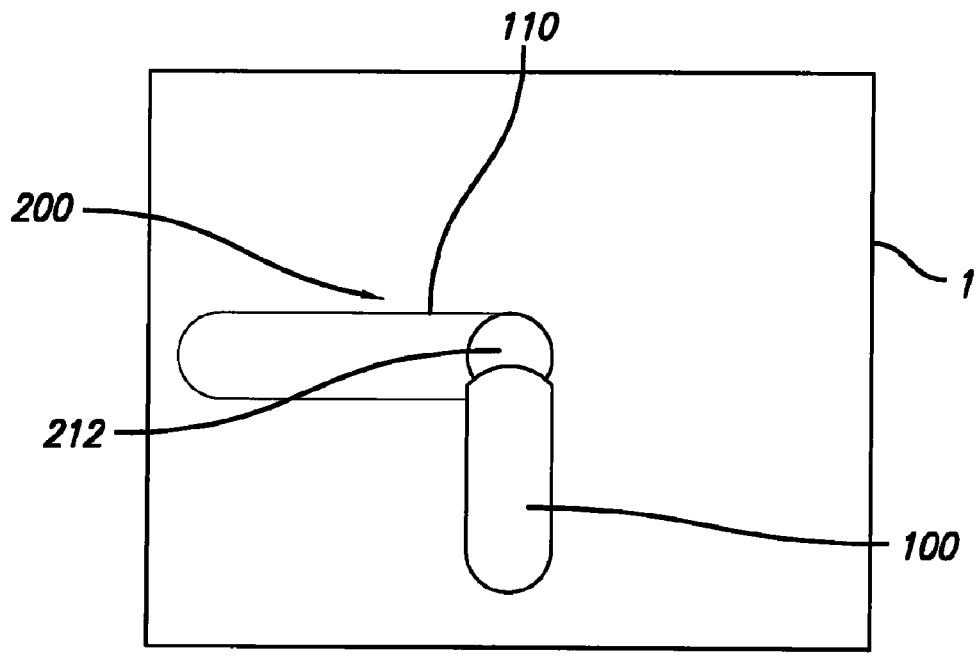
FIG. 12 is a rear view of a support unit supporting an object at a second support angle position in a second support orientation according to an embodiment of the present invention.

In this position, the object 1 may be supported at a steep support angle in a portrait orientation. With reference to FIG. 11, the object 1 is supported at a support angle θ1 between the surface 40 and the object 1, and a corresponding viewing angle θ2. In this position, the object 1 may be supported at a steep support angle in a portrait orientation. In one embodiment, the support angle θ1 is in the range of from about 65 degrees to about 85 degrees, and the corresponding viewing angle θ2 is in the range of from about 5 degrees to about 25 degrees. In one embodiment, the support angle θ1 is in the range of from about 70 degrees to about 80 degrees, and the corresponding viewing angle θ2 is in the range of from about 10 degrees to about 20 degrees. In one embodiment, the support angle θ1 is about 75 degrees, and the corresponding viewing angle θ2 is about 15 degrees. In this position, the stand 100 extends from the support unit 300 in a direction (as denoted by the arrow S in FIG. 10) opposite the top of the object (denoted by the arrow T in FIG. 10).

Figure 13:
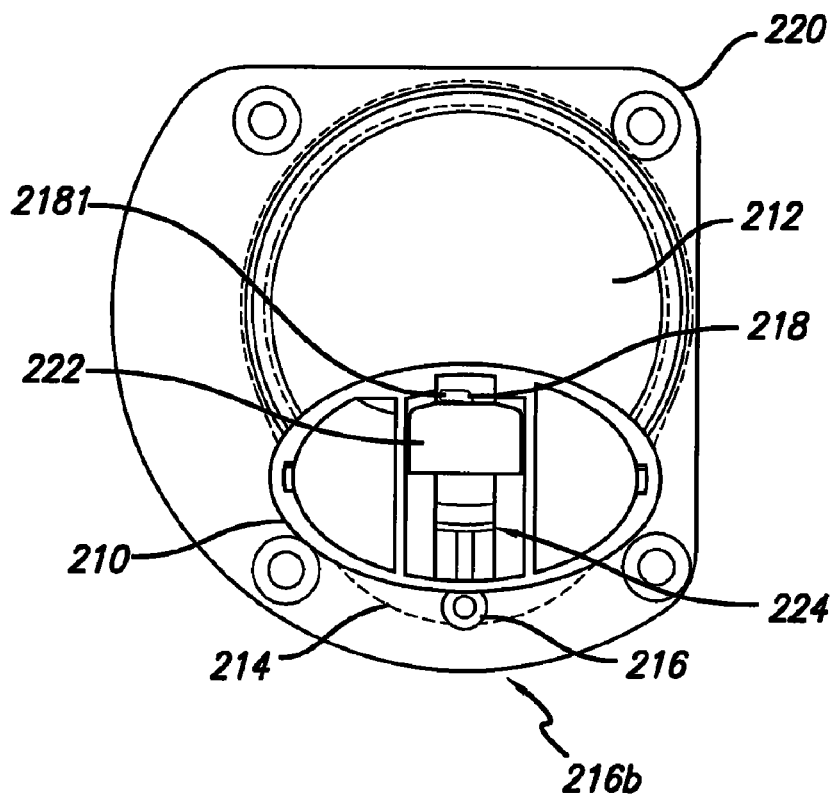
FIG. 13 is a rear cross-sectional view of the support unit of FIG. 12 according to an embodiment of the present invention.
Figure 14:
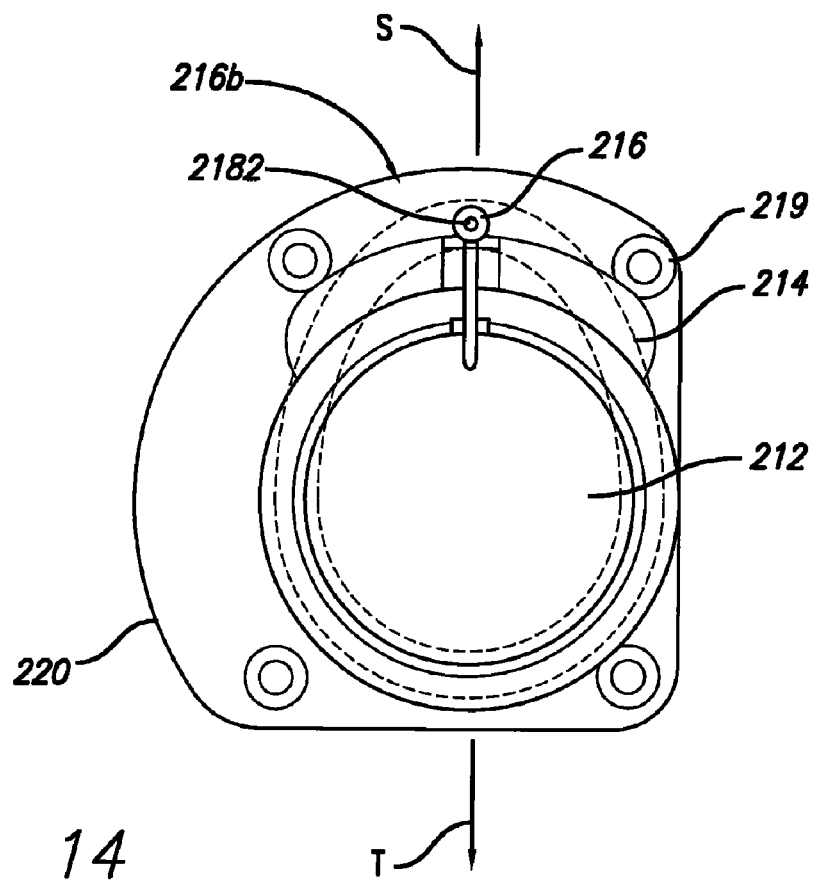
FIG. 14 is a front partially transparent view of the support unit of FIG. 12 according to an embodiment of the present invention.

With reference to FIGS. 12-15, the user may manipulate the joint 200 such that it is positioned in a second support position corresponding to cam follower position 216b. In one embodiment, the user may rotate the stand 100 thereby causing the socket 212 to rotate within the housing 220. As shown in FIGS. 13 and 14, as the socket 212 rotates, the cam follower 216 slides within the cam track 214. The ball 210 translates within the socket 212, thereby causing the clamp 222 to slide within the track 224. The user may rotate the joint 200 until the cam follower 216 is secured in the notch 217 corresponding to the desired second support position.

Figure 15:
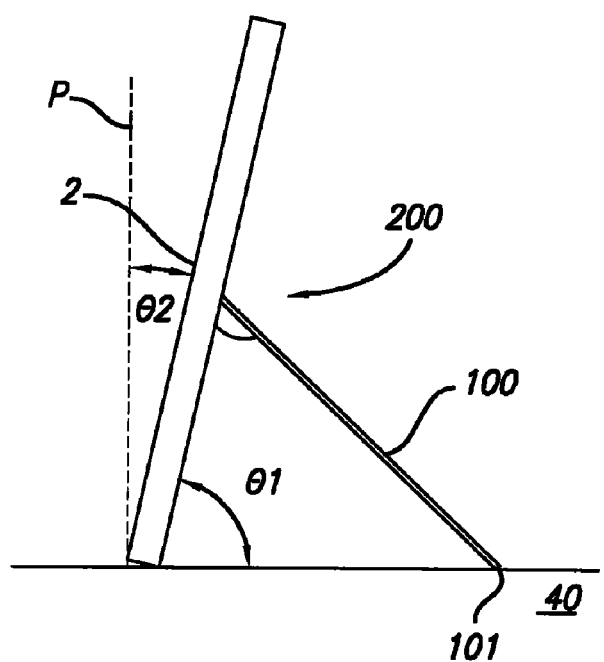
FIG. 15 is a side view of the support unit of FIG. 12 supporting the object on a surface according to an embodiment of the present invention.
Figure 16:
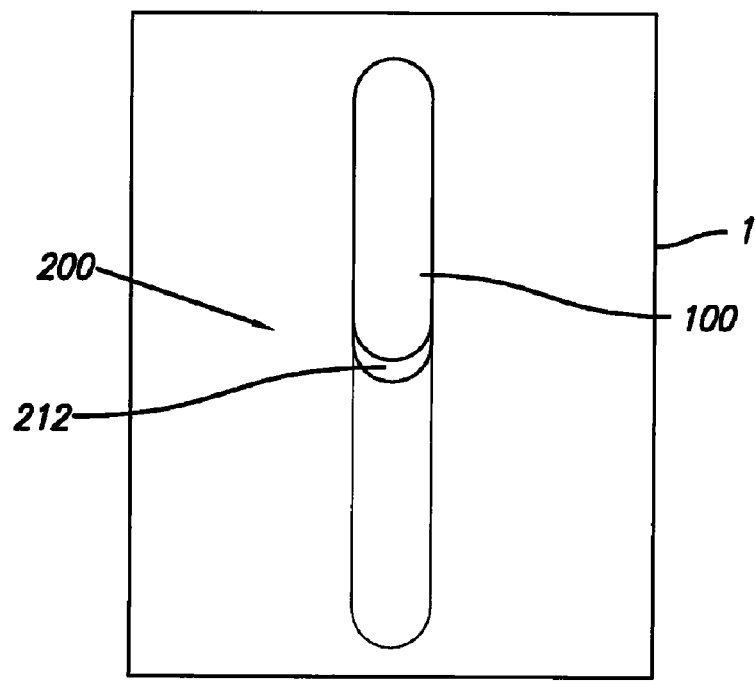
FIG. 16 is a rear view of a support unit supporting an object at a third support angle position in a third support orientation according to an embodiment of the present invention.

In this position, the object 1 may be supported at a steep support angle in a landscape orientation. With reference to FIG. 15, the object 1 is supported at a support angle $\theta 1$ between the surface 40 and the object 1, and a corresponding viewing angle $\theta 2$. In one embodiment, the support angle $\theta 1$ is in the range of from about 70 degrees to about 85 degrees, and the corresponding viewing angle $\theta 2$ is in the range of from about 5 degrees to about 20 degrees. In one embodiment, the support angle $\theta 1$ is in the range of from about 75 degrees to about 80 degrees, and the corresponding viewing angle $\theta 2$ is in the range of from about 10 degrees to about 15 degrees. In one embodiment, the support angle $\theta 1$ is about 80 degrees, and the corresponding viewing angle $\theta 2$ is about 10 degrees. In this position, the stand 100 extends from the support unit 300 in a direction (as denoted by the arrow S in FIG. 14) opposite the top of the object (denoted by the arrow T in FIG. 14).

Figure 17:
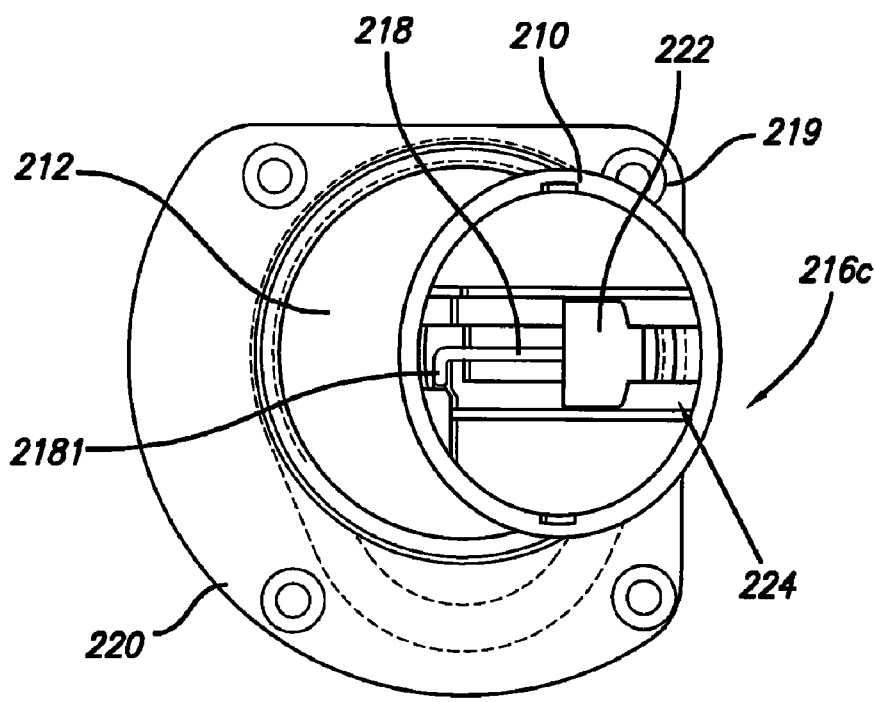
FIG. 17 is a rear cross-sectional view of the support unit of FIG. 16 according to an embodiment of the present invention.
Figure 18:
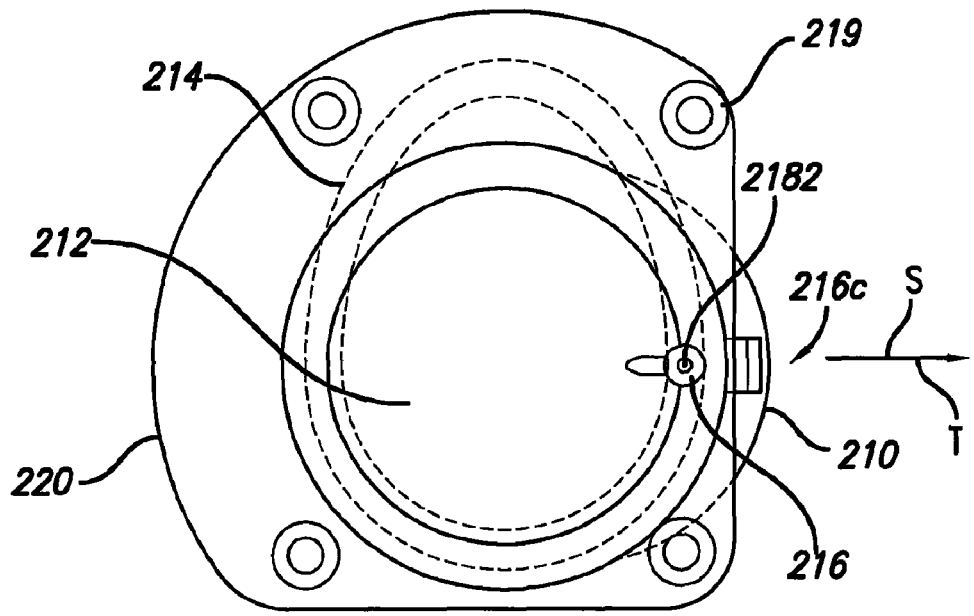
FIG. 18 is a front partially transparent view of the support unit of FIG. 16 according to an embodiment of the present invention.

With reference to FIGS. 16-19, the user may manipulate the joint 200 such that it is positioned in a third support position corresponding to cam follower position 216c. In one embodiment, the user may rotate the stand 100 thereby causing the socket 212 to rotate within the housing 220. As shown in FIGS. 17 and 18, as the socket 212 rotates, the cam follower 216 slides within the cam track 214. The ball 210 translates within the socket 212, thereby causing the clamp 222 to slide within the track 224. The user may rotate the joint 200 until the cam follower 216 is secured in the notch 217 corresponding to the desired third support position. In this position, the stand 100 extends from the support unit 300 in the same direction (as denoted by the arrow S in FIG. 18) as the top of the object. As a result, the stand 100 may be rotated such that the exterior face 102 of the stand 100 at the support end 101 faces and contacts the surface 40.

In this position, the object 1 may be supported at a shallow support angle in a portrait orientation. With reference to FIG. 19, the object 1 is supported at a support angle $\theta 1$ between the surface 40 and the object 1, and a corresponding viewing angle $\theta 2$. In one embodiment, the support angle $\theta 1$ is in the range of from about 5 degrees to about 20 degrees, and the corresponding viewing angle $\theta 2$ is in the range of from about 70 degrees to about 85 degrees. In one embodiment, the support angle $\theta 1$ is in the range of from about 10 degrees to about 15 degrees, and the corresponding viewing angle $\theta 2$ is in the range of from about 75 degrees to about 80 degrees. In one embodiment, the support angle $\theta 1$ is about 10 degrees, and the corresponding viewing angle $\theta 2$ is about 80 degrees.

Figure 21:
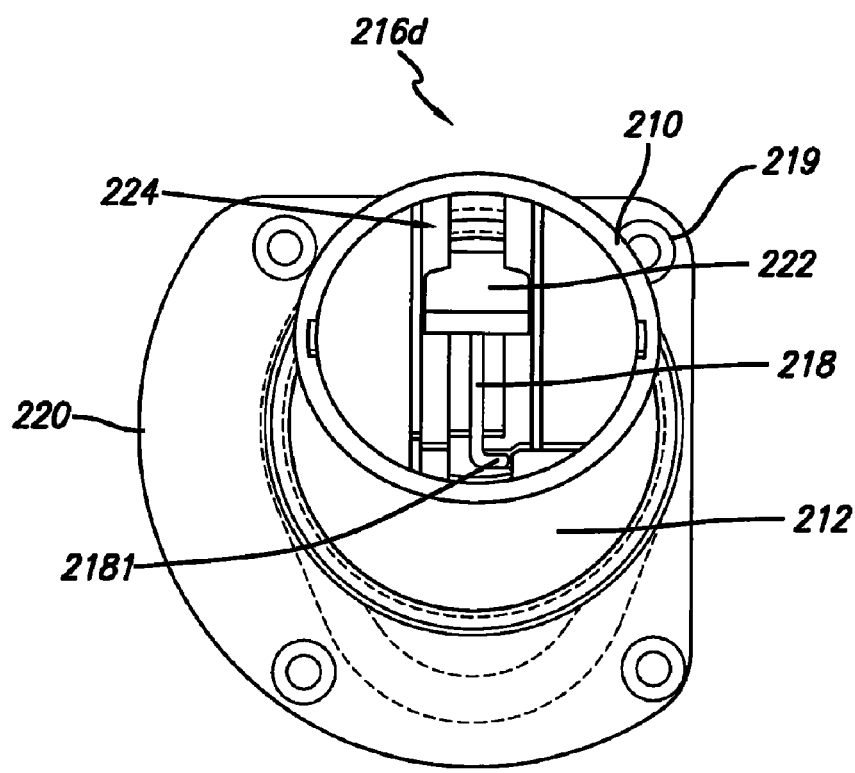
FIG. 21 is a rear cross-sectional view of the support unit of FIG. 20 according to an embodiment of the present invention.
Figure 22:
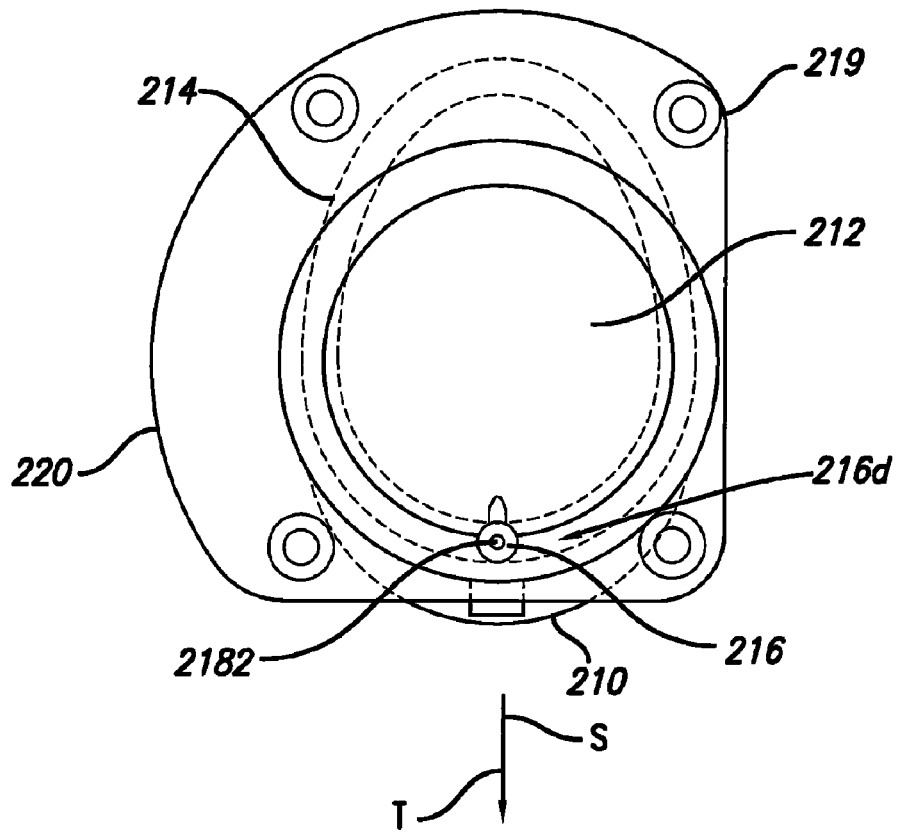
FIG. 22 is a front partially transparent view of the support unit of FIG. 20 according to an embodiment of the present invention.
Figure 23:
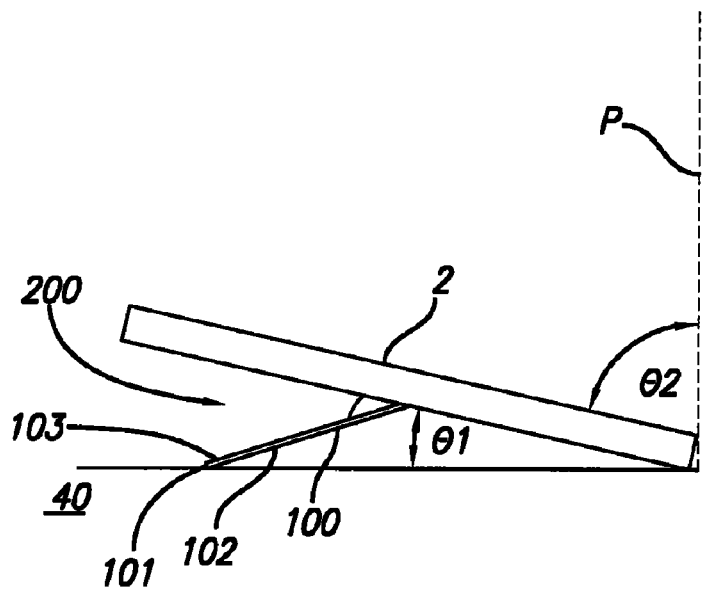
FIG. 23 is a side view of the support unit of FIG. 20 supporting the object on a surface according to an embodiment of the present invention.

With reference to FIGS. 20-23, the user may manipulate the joint 200 such that it is positioned in a fourth support position corresponding to cam follower position 216d. In one embodiment, the user may rotate the stand 100 thereby causing the socket 212 to rotate within the housing 220. As shown in FIGS. 21 and 22, as the socket 212 rotates, the cam follower 216 slides within the cam track 214. The ball 210 translates within the socket 212, thereby causing the clamp 222 to slide within the track 224. The user may rotate the joint 200 until the cam follower 216 is secured in the notch 217 corresponding to the desired fourth support position. In this position, the stand 100 extends from the support unit 300 in the same direction (as denoted by the arrow S in FIG. 22) as the top of the object. As a result, as shown in FIG. 23, the stand 100 may be rotated such that the exterior face 102 of the stand 100 at the support end 101 faces and contacts the surface 40.

In this position, the object 1 may be supported at a shallow support angle in a landscape orientation. With reference to FIG. 23, the object 1 is supported at a support angle $\theta 1$ between the surface 40 and the object 1, and a corresponding viewing angle $\theta 2$. In one embodiment, the support angle $\theta 1$ is in the range of from about 5 degrees to about 20 degrees, and the corresponding viewing angle $\theta 2$ is in the range of from about 70 degrees to about 85 degrees. In one embodiment, the support angle $\theta 1$ is in the range of from about 10 degrees to about 15 degrees, and the corresponding viewing angle $\theta 2$ is in the range of from about 75 degrees to about 80 degrees. In one embodiment, the support angle $\theta 1$ is about 10 degrees, and the corresponding viewing angle $\theta 2$ is about 80 degrees.

Figure 24:
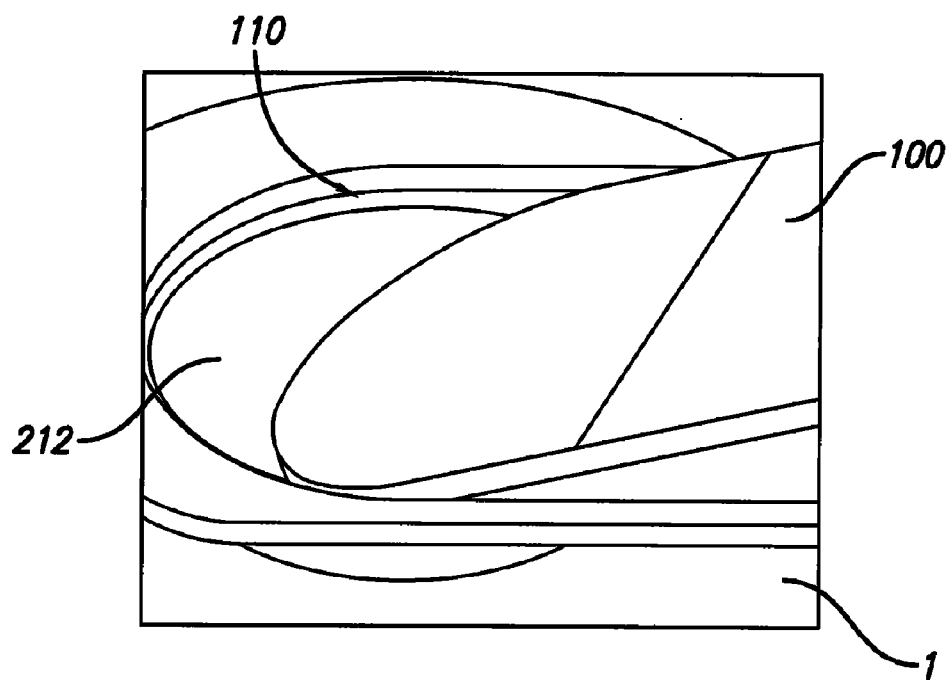
FIG. 24 is a detailed view of a support unit having a recess according to an embodiment of the present invention.
Figure 25:
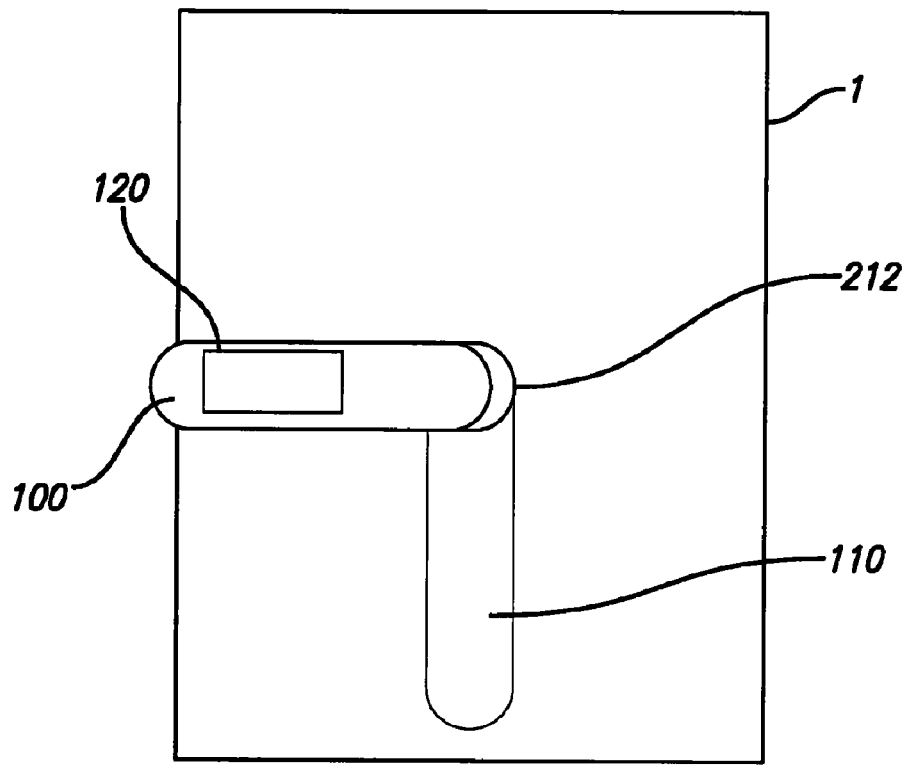
FIG. 25 is a rear view of stand operatively connected to an object according to an embodiment of the present invention.

As discussed above, the stand 100 may be manipulated between a closed and open position. In one embodiment, as shown in FIGS. 24 and 25, a recess 110 for receiving the stand 100 while in the closed position may be formed in the object 1. The recess may be sized and shaped appropriately to receive the stand 100 and allow the stand to be flush with the object 1 when the stand is in the closed position so as to provide an aesthetically uniform appearance. In this manner, the object also may be more easily stored or transported. In one embodiment, as shown in FIG. 25, the stand 100 may include a void 120 formed therein. The void 120 may facilitate user access to and outward opening of the stand 100 from the recess 110.

Figure 26:
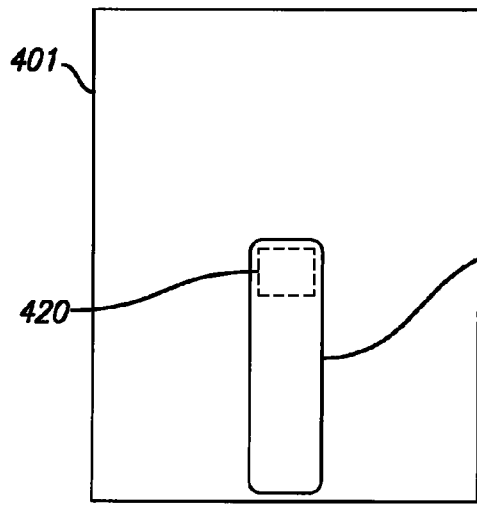
FIG. 26 is a rear view of an object having a support unit according to an embodiment of the present invention.
Figure 27:
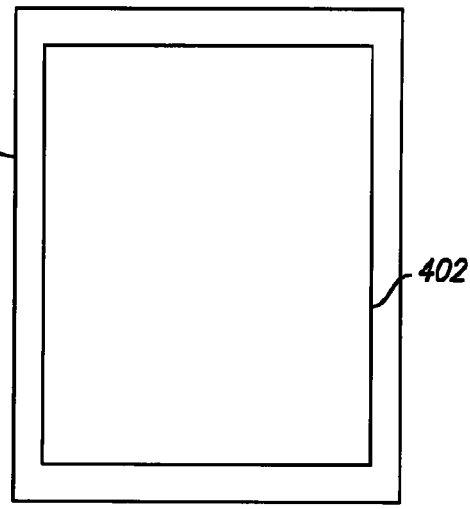
FIG. 27 is a front view of the object of FIG. 26 according to an embodiment of the present invention.
Figure 28A:
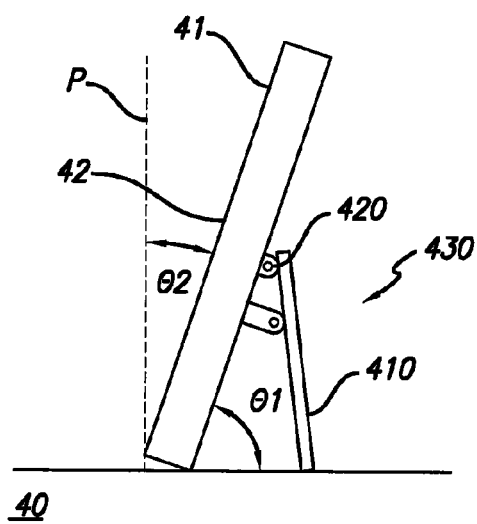
FIG. 28A is a side view of the support unit of FIG. 26 supporting an object on a surface in a steep support angle position according to an embodiment of the present invention.
Figure 28B:
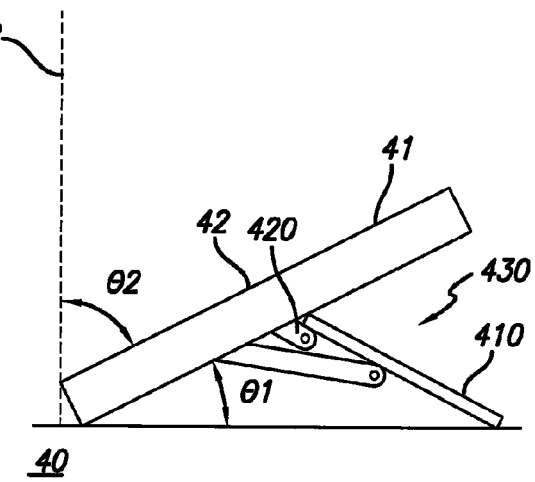
FIG. 28B is a side view of the support unit of FIG. 26 supporting an object on a surface in a steep support angle position according to an embodiment of the present invention.

A support unit 430 according to an alternative embodiment of the present invention will now be described with reference to FIGS. 26-33, in which like reference numerals may refer to like elements. As shown in FIG. 26, the support unit 430 may include a stand 410 for supporting an object 401 on a surface 40, and a joint 420. The joint 420 may be connected to and/or connectable to the object 401 that is to be supported. The joint 420 is adapted to selectively move in order to allow the stand 410 to move between a plurality of support angle positions and/or support orientations for the object. As discussed above, the object 401 may comprise any object suitable for being supported. In one embodiment, as shown in FIG. 27, the object 401 may comprise an object having a display 402, such as, for example, a computer.

The support unit 430 may be configured to selectively support the object 401 on the surface 40 in a plurality of support angle positions, as discussed above with respect to support units 30 and 300. For example, the support unit 430 may be configured to selectively support the object 401 on the surface 40 at one or more support angles $\theta 1$ between the object 401 and the surface 40, as shown, for example, in FIGS. 28A and 28B. As a result, in embodiments of the present invention in which the object 401 includes a display 402, the support unit 430 may be configured to selectively support the object 401 on the surface 40 at one or more corresponding viewing angles $\theta 2$ between the display 402 and a vertical plane P generally perpendicular to the surface 40.

The support unit 430 may be configured to provide the display 402 to the user according to the user's needs. In this manner, the support unit 30 may be configured to selectively support the object 401 in a steep support angle position (as shown, for example, in FIG. 28A) and in a shallow support angle position (as shown, for example, in FIG. 28B). For example, a steep support angle position may be useful when the user is using the display 402 for viewing purposes and/or when the user is seated at a desk and is viewing the display 402 from a lower position. A shallow support angle position, for example, may be useful when the user is using the display 402 for input purposes (such as, for example, when the display 402 is being used as a virtual keyboard) and/or when the user is standing and is viewing the display 402 from a higher position.

In one embodiment, a steep support angle position may comprise an angle θ1 between the object 401 and the surface 40 that is greater than about 45 degrees, and a shallow support angle position may comprise an angle θ1 between the object 401 and the surface 40 that is less than about 45 degrees. In one embodiment, a steep support angle position may comprise an angle θ1 between the object 401 and the surface 40 that is greater than about 65 degrees. In one embodiment, a shallow support angle position may comprise an angle θ1 between the object 401 and the surface 40 that is less than about 25 degrees. The ranges of angles provided are meant to be exemplary only, and it is appreciated that the support unit 430 may be configured to support the object in other desired support angle positions.

Figure 29:
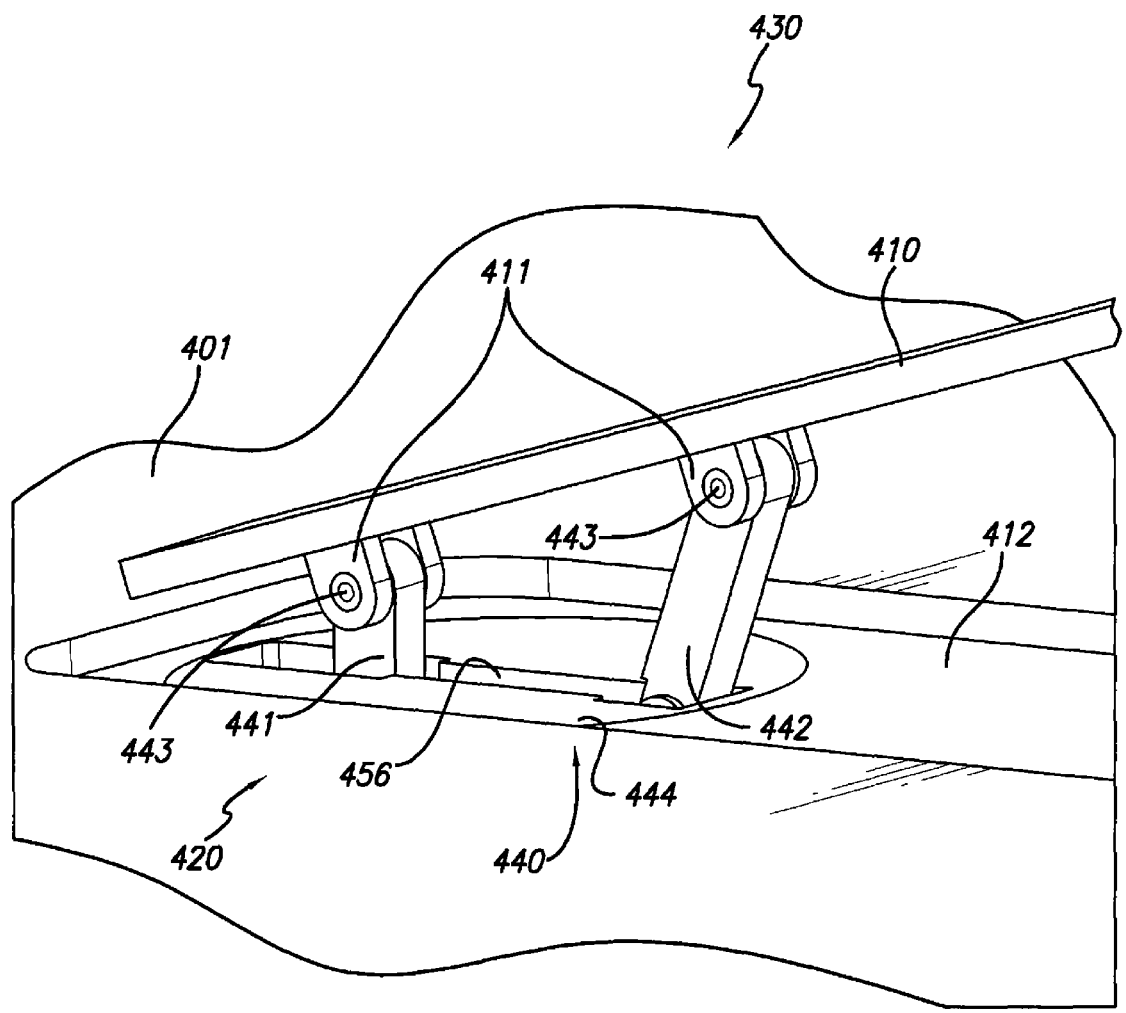
FIG. 29 is a perspective view of a support unit according to an alternative embodiment of the present invention.
Figure 30:
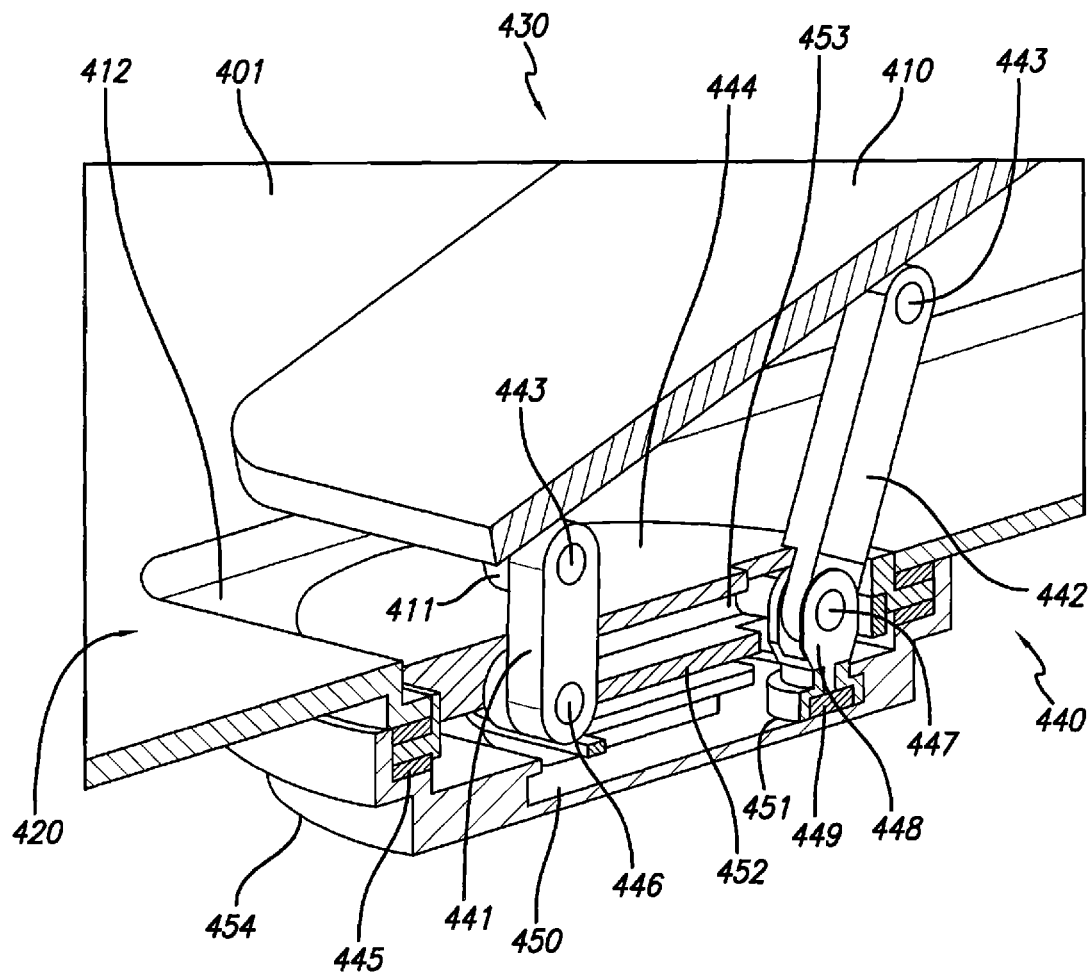
FIG. 30 is a cross-sectional view of the support unit of FIG. 29 according to an embodiment of the present invention.

With reference to FIGS. 29 and 30, in one embodiment, the joint 420 may comprise a linkage assembly 440 pivotally connected to the stand 410 and operatively connected to a linkage base 444, which is adapted to rotate within a housing 454. By rotating the linkage base 444 and pivoting the linkage assembly 440, the stand 410 may be rotated and pivoted through a plurality of positions and may define the position (e.g., angle and orientation) at which the object 401 is supported.

The linkage assembly 440 may be disposed within the housing 454 and may include a first linkage member 441 and a second linkage member 442. During operation, the first linkage member 441 and the second linkage member 442 may extend through an opening 456 in the linkage base 444. The first linkage member 441 and the second linkage member 442 are sized to provide the desired angles and positions for supporting the object 401. In one embodiment, the first linkage member 441 may have a different length than the second linkage member 442. For example, as shown in FIG. 29, the first linkage member 441 may be shorter than the second linkage member 442. In other embodiments, the first linkage member 441 and the second linkage member 442 may be the same length, or the first linkage member 441 may be longer than the second linkage member 442.

In one embodiment, at their upper ends the first and second linkage members 441 and 442 may be attached to hubs 411 formed on the stand 410. In one embodiment, the first and second linkage members 441 and 442 may be attached to hubs 411 by upper pins 443. The upper pins 443 may act as pivot points such that the stand 410 may rotate about the upper pins 443 inwardly and outwardly from the object 401. In other embodiments, the first and second linkage members 441 and 442 may be attached to the hubs 411 by other means, such as, for example, screws or other means that allow rotation of the stand 410 about the pivot point.

Figure 31:
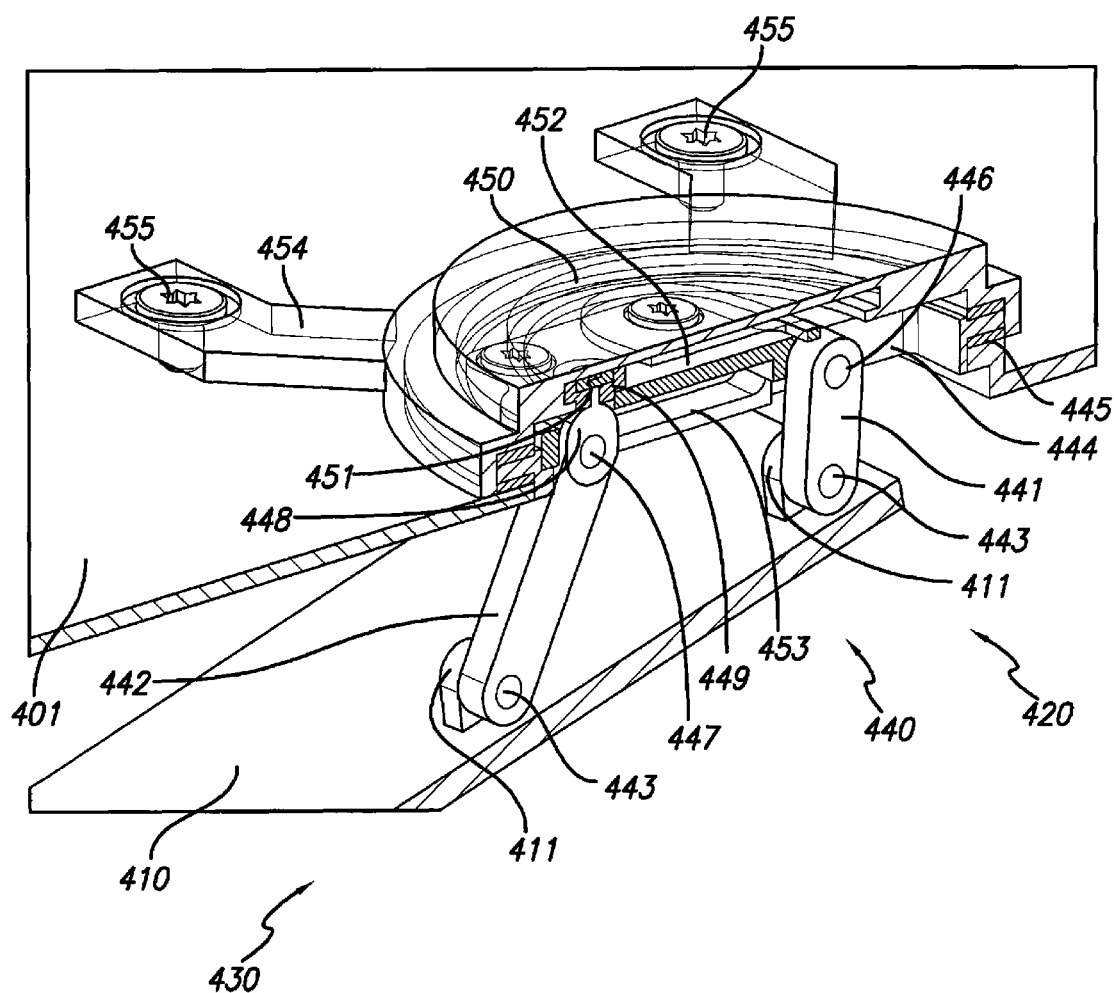
FIG. 31 is a cross-sectional view of the support unit of FIG. 29 according to an embodiment of the present invention.

As shown in FIGS. 30 and 31, in one embodiment the first linkage member 441 and the second linkage member 442 may rotate at their lower ends about lower pins 446 and 447, respectively. The first linkage member 441 may be attached at its lower end to a plate 452, which is fixed within the housing 454, by the lower pin 446. As with the upper pin 443, the lower pin 446 may act as a pivot point. As the first linkage member 441 rotates about the lower pin 446, the stand 410 may correspondingly rotate about the upper pin 443. The second linkage member 442 may be rotatably attached to a lower hub 448 by lower pin 447. As the second linkage member 442 rotates about the lower pin 447, the stand 410 may correspondingly rotate about the upper pin 443.

Figure 32:
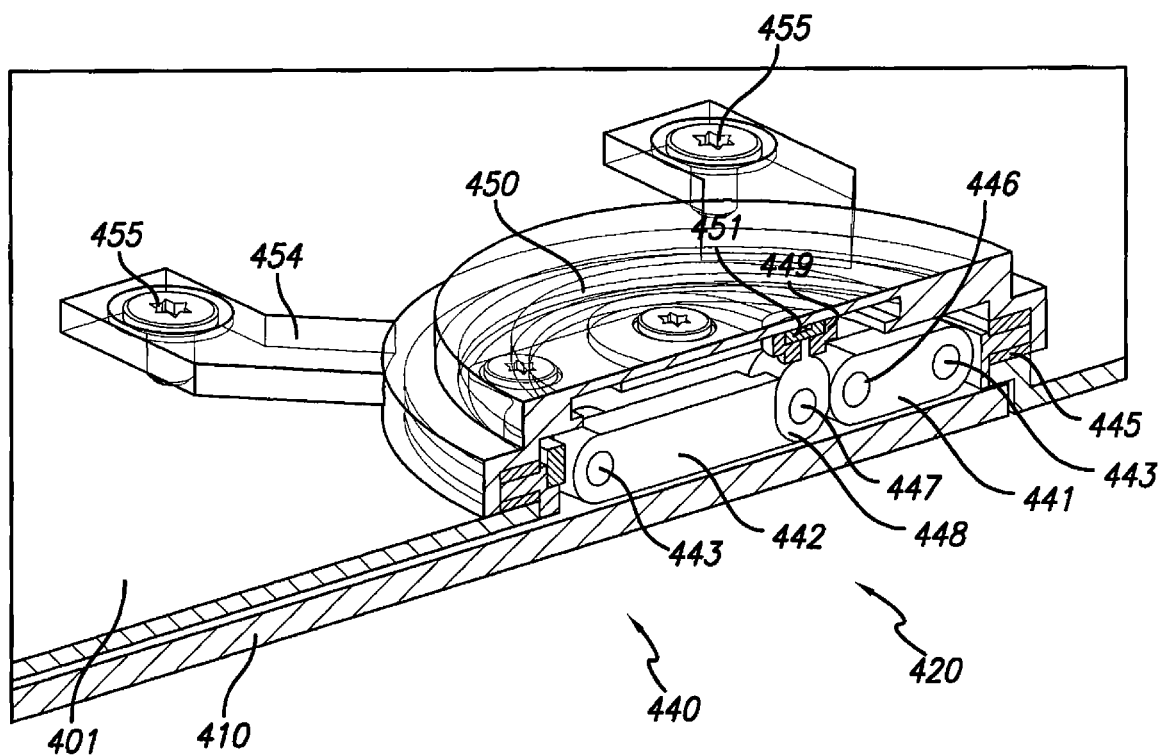
FIG. 32 is a is a cross-sectional view of the support unit of FIG. 29 in a closed position according to an embodiment of the present invention.
Figure 33:
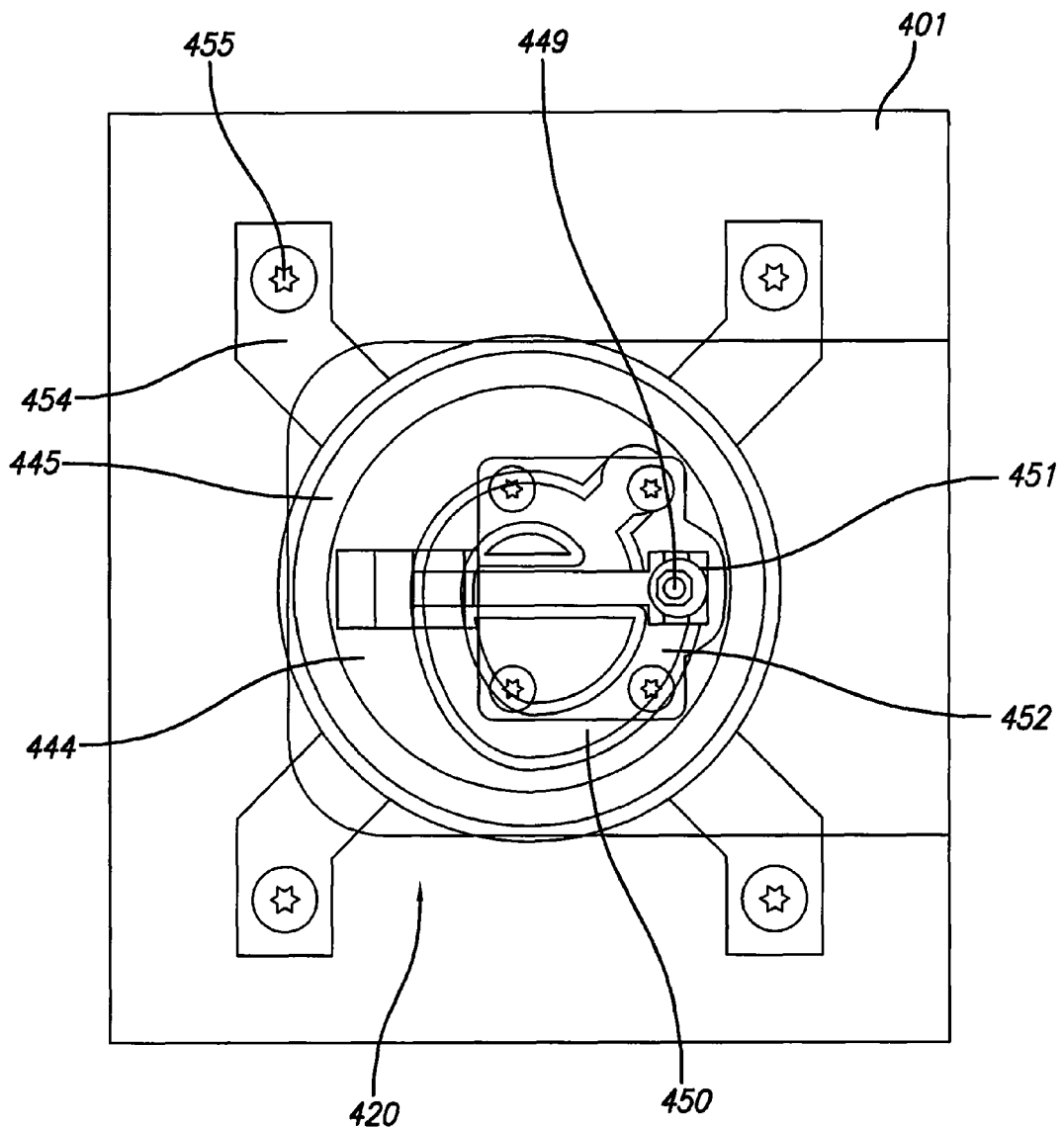
FIG. 33 is a front partially transparent view of the support unit of FIG. 29 according to an embodiment of the present invention.

A cam follower 449 may be connected to the lower hub 448. In one embodiment, the cam follower may be part of the hub 448 so as to form a unitary structure. The cam follower 449 is adapted to slide within a cam track 450. In one embodiment, as shown in FIGS. 31-33, the cam track 450 may be a channel formed within the housing 454. In embodiments in which the support unit 430 is integral with the object 401 to be supported, the cam track 450 may be formed within the object 401 itself. For example, the cam track 450 may be formed in a housing or external surface of the object 401. Similarly, the housing 454 may form a part of the object 401. In one embodiment, the housing 454, and thereby all or a portion of the support unit 430, may be attachable to the object 401 by securing means 455, such as, for example, a screw. For example, the housing 454 may be attached to an internal surface of the object 401, as shown in FIG. 30. Other securing means 455, including, but not limited to, magnets, adhesive, suction cups, locking means, latching means, or other suitable means may be used. In one embodiment, the support unit 430 may be removably securable to the object 401. In this manner, in some embodiments the support unit 430 may be manufactured and/or sold separately from the object 401 to be supported.

The support unit 430 may be configured to selectively support the object 401 at one or more support angle positions and in one or more support orientations. In one embodiment of the present invention, the support unit 430 may be adapted to provide a finite number of support positions, each position corresponding to a particular support angle position and support orientation. In one embodiment, a notch 451 may be formed in the cam track 450 at each support position, such that the cam follower 449 engages each notch 451 as it rotates about the cam track. With the cam follower 449 engaged at a corresponding notch, the stand 410 may be secured in that position and will not rotate without additional rotating force being applied. As such, the stand 410 may be sufficiently stable such that it may support the object 401.

As the user rotates the stand 410, and, correspondingly, the cam follower 449 within the cam track 450, the user may "feel" when follower reaches a notch 451. As such, each notch 451 may further provide a tactile feature such that it facilitates the user finding a particular support position. In an alternative embodiment, the notch 451 may be formed in the cam follower 449 and a spring-loaded protrusion may be formed in the cam track at each support position. The protrusion may be formed such that the follower 449 is secured at each protrusion as it rotates about the cam track. In still another embodiment, the cam follower 449 may be spring-loaded to further engage each notch 451 and become locked into position.

In one embodiment, the linkage base 444 is adapted to rotate 360 degrees. In other embodiments, the linkage base 444 may be adapted to rotate less than 360 degrees. In one embodiment, the joint 420 may include a bushing 445 disposed within the housing 454. The linkage base 444 may be disposed such that it may freely rotate within the bushing 445. The bushing 445 may be made of a low friction material, such as, for example, plastic or the like to facilitate rotation of the linkage base 444.

With reference to FIG. 32, the initial extraction of the stand 410 will now be described. The support unit 430 may be adapted to move between a closed position, as shown in FIG. 32, and an initial open position, as shown in FIG. 31. Before operation (e.g., during storage of the object 401) the stand 410 may be disposed in the recess 412 (as shown, for example, in FIG. 30), and, as a result, may be flush with the object 401. When the support unit 430 is in the closed position, the first linkage member 441 and the second linkage member 442 may be pivoted about the lower pins 446 and 447, respectively, such that the stand is collapsed and disposed against the object 401. In this position, the first linkage member 441 and the second linkage member 442 may be collapsed within the housing 454 such that the linkage members do not extend through the opening 456 in the linkage base 444.

When the support unit 430 is moved into an initial open position, as shown in FIG. 31, the stand 410 is moved outwardly from the object 401. As the stand 410 moves outwardly, the first linkage member 441 rotates about the lower pin 446 and the second linkage member 442 rotates about the lower pin 447. The lower pin 447 may be adapted to slide within a groove 453 formed between the plate 452 and the linkage base 444, as shown in FIGS. 30 and 31. As the lower pin 447 slides within the groove 453, the cam follower 449 slides within the cam track 450. When the stand 410 is in the initial open position, the lower pin 447 is at the end of the groove 453, as shown in FIGS. 31 and 33. The stand 410 may now be rotated to its desired position.

As the stand 410 rotates, the linkage base 444 rotates within the bushing 445, thereby rotating the linkage assembly 440. As a result, the cam follower 449 slides within the cam track 450. The stand 410 may be rotated until it is secured in the notch 451 corresponding to the desired support angle position and orientation.

While the invention has been described in terms of several embodiments, there are alterations, permutations, and equivalents, which fall within the scope of this invention. It is therefore intended that the following appended claims be interpreted as including all such alterations, permutations, and equivalents as fall with the true spirit and scope of the present invention.

What is claimed is:

1. A support mechanism for supporting an object on a surface, comprising:
   a joint comprising:
      a socket connected to an object,
      a ball, and
      a linking member connected to the ball;
   a cam track formed in the object, wherein the joint is operatively connected to the cam track; and
   a stand connected to the joint for supporting the object on a surface, wherein the joint selectively rotates to allow the stand to support the object on the surface in:
   a first position comprising a landscape orientation at a first angle between the object and the surface,
   a second position comprising a landscape orientation at a second angle between the object and the surface,
   a third position comprising a portrait orientation at a third angle between the object and the surface, and
   a fourth position comprising a portrait orientation at a fourth angle between the object and the surface.

2. The support mechanism of claim 1, further comprising: a cam coupled to the linking member and disposed in the track and movable between the first position, the second position, the third position, and the fourth position.

3. The support mechanism of claim 2, further comprising a plurality of notches formed in the cam track wherein each notch corresponds to one of the first position, the second position, the third position, and the fourth position.

4. The support mechanism of claim 1, wherein the socket rotates within a housing of the object.

5. The support mechanism of claim 1, wherein the stand supports the object only in the first position, the second position, the third position, and the fourth position.

6. The support mechanism of claim 1, wherein the first angle is about 80 degrees, and the second angle is about 10 degrees.

7. The support mechanism of claim 1, wherein the third angle is about 75 degrees, and the fourth angle is about 10 degrees.

8. The support mechanism of claim 1, wherein the object is a device with a visual display.

9. The support mechanism of claim 1, wherein the object is a computer.

10. The support mechanism of claim 1, wherein the joint is removably attached to the object.

11. The support mechanism of claim 1, wherein the cam track is elliptical.

12. The support mechanism of claim 1, wherein the cam track is formed about the socket.

13. A display apparatus, comprising:
   a device having a visual display and a housing;
   a cam track formed in the housing;
   a joint operatively connected to the cam track, wherein the joint comprises a ball and socket joint; and
   a stand connected to the joint for supporting the device, wherein the joint rotates the stand between a first support orientation at a first viewing angle of the visual display and in a second support orientation at a second viewing angle of the visual display.

14. The display apparatus of claim 13, wherein the first viewing angle and the second viewing angle are different, and the first support orientation and the second support orientation are the same.

15. The display apparatus of claim 14, wherein the first viewing angle is greater than about 45 degrees and the second viewing angle is less than about 45 degrees.

16. The display apparatus of claim 13, wherein the support orientation is selected from the group consisting of: a landscape orientation and a portrait orientation.

17. The display apparatus of claim 13, wherein the device comprises a computer.

18. The display apparatus of claim 13, further comprising a recess formed in the device for receiving the stand.

19. The display apparatus of claim 13, further comprising a void formed in the stand.

20. The display apparatus of claim 13, wherein the joint comprises: a base disposed within the housing, the base adapted to rotate within the housing; a first linkage member having a first end operatively connected to the stand and a second end operatively connected to the base; and a second linkage member having a first end operatively connected to the stand and a second end operatively connected to the base.

21. A computer having a housing and a visual display with a variable viewing angle defined by the position of the display relative to a vertical plane, the computer comprising:
   a socket operatively connected to the computer;
   a ball operatively connected to the socket;
   a stand connected to the ball for supporting the computer on a surface, wherein the ball and the socket rotate the stand between a landscape orientation at a first viewing angle, a landscape orientation at a second viewing angle, a portrait orientation at a third viewing angle, and a portrait orientation at a fourth viewing angle
   a track formed in the computer housing, wherein the ball is operatively connected to the track;
   a linking member having a first end coupled to the ball; and
   a cam coupled to a second end of the linking member and movably disposed in the track.

22. A support unit for supporting an object on a surface, comprising:

a housing connected to an object;

a joint disposed at least partially within the housing wherein the joint comprises a socket disposed in the housing and adapted to rotate in the housing, and a ball operatively connected to the socket;

a linking member connecting the joint to the housing; and a stand operatively connected to the joint for supporting the object on a surface, wherein the stand is adapted to support the object in:

a portrait support orientation at a first support angle greater than about 45 degrees between the object and the surface, a portrait support orientation at a second support angle less than about 45 degrees between the object and the surface, a landscape support orientation at a third support angle greater than about 45 degrees between the object and the surface, and a landscape support orientation at a fourth support angle less than about 45 degrees between the object and the surface.

23. The support unit of claim 22, wherein the housing is formed integral with the object.

24. A support mechanism for supporting an object on a surface, comprising:

a joint comprising:
 a socket connected to an object,
 a ball, and
 a linking member connected to the ball;

a stand connected to the joint for supporting the object on a surface, wherein the joint selectively rotates to allow the stand to support the object on the surface in:

a first position comprising a landscape orientation at a first angle between the object and the surface, a second position comprising a landscape orientation at a second angle between the object and the surface, a third position comprising a portrait orientation at a third angle between the object and the surface, and a fourth position comprising a portrait orientation at a fourth angle between the object and the surface;

a cam track formed in the object; and a cam coupled to the linking member and disposed in the track and movable between the first position, the second position, the third position, and the fourth position.

25. The support mechanism of claim 24, further comprising a plurality of notches formed in the cam track wherein each notch corresponds to one of the first position, the second position, the third position, and the fourth position.

26. A support mechanism for supporting an object on a surface, comprising:

a joint comprising:
 a socket connected to an object,
 a ball, and
 a linking member connected to the ball; and a stand connected to the joint for supporting the object on a surface, wherein the joint selectively rotates to allow the stand to support the object on the surface in:

a first position comprising a landscape orientation at a first angle between the object and the surface, a second position comprising a landscape orientation at a second angle between the object and the surface, a third position comprising a portrait orientation at a third angle between the object and the surface, and a fourth position comprising a portrait orientation at a fourth angle between the object and the surface, wherein the socket rotates within a housing of the object.

27. A support unit for a display apparatus having a visual display, comprising:

a housing for connecting to the apparatus;

an elliptical cam track formed in the housing;

a joint operatively connected to the cam track; and a stand connected to the joint for supporting the apparatus, wherein the joint rotates the stand between a first support orientation at a first viewing angle of the visual display and in a second support orientation at a second viewing angle of the visual display.

28. The support unit of claim 27, wherein the joint comprises a socket, and a ball operatively connected to the socket.

29. The support unit of claim 27, wherein the first viewing angle and the second viewing angle are different, and the first support orientation and the second support orientation are the same.

30. The support unit of claim 27, wherein the display apparatus is a tablet computer.

31. A support unit for a display apparatus having a visual display, comprising:

a housing for connecting to the apparatus;

a cam track formed in the housing;

a joint operatively connected to the cam track, wherein the joint comprises a socket, and a ball operatively connected to the socket; and a stand connected to the joint for supporting the apparatus, wherein the joint rotates the stand between a first support orientation at a first viewing angle of the visual display and in a second support orientation at a second viewing angle of the visual display.

32. The support unit of claim 31, wherein the first viewing angle and the second viewing angle are different, and the first support orientation and the second support orientation are the same.

33. The support unit of claim 31, the first viewing angle is greater than about 45 degrees and the second viewing angle is less than about 45 degrees.

34. The display apparatus of claim 33, wherein the support orientation is selected from the group consisting of: a landscape orientation and a portrait orientation.

35. The support unit of claim 31, wherein the display apparatus is a tablet computer.

36. The support unit of claim 31, wherein the cam track is formed about the socket.

37. The support unit of claim 31, further comprising a void formed in the stand.

38. The support unit of claim 31, further comprising a plurality of notches formed in the cam track wherein each notch corresponds to one of the first viewing angle and the second viewing angle.

* * * * *